United States Patent [19]

Handke et al.

[11] Patent Number: 4,779,186

[45] Date of Patent: Oct. 18, 1988

[54] AUTOMATIC DENSITY CONTROL SYSTEM FOR BLENDING OPERATION

[75] Inventors: Wayne A. Handke; Scott A. Berning, both of Duncan, Okla.

[73] Assignee: Halliburton Company, Duncan, Okla.

[21] Appl. No.: 946,711

[22] Filed: Dec. 24, 1986

[51] Int. Cl.⁴ .................... G06F 15/46; G05D 11/13
[52] U.S. Cl. ................................ 364/172; 137/88; 137/101.19; 222/52; 364/502; 364/510; 366/152
[58] Field of Search ............... 364/172, 173, 180, 478, 364/479, 502, 509, 510, 420–422; 366/151–153, 160, 132, 133; 137/101.19, 101.21, 268, 3, 88; 222/1, 52, 55, 57

[56] References Cited

U.S. PATENT DOCUMENTS

| | | | |
|---|---|---|---|
| Re. 18,063 | 5/1931 | Steinhauer | 222/627 X |
| 2,024,478 | 12/1935 | Short | 137/164 |
| 2,658,644 | 11/1953 | Lowe | 222/52 |
| 2,704,173 | 3/1955 | Edwards | 222/508 |
| 2,873,036 | 2/1959 | Noble | 214/2 |
| 3,027,099 | 3/1962 | Ludwig | 241/33 |
| 3,041,049 | 6/1962 | Tarukawa | 259/9 |
| 3,053,577 | 9/1962 | Ungashick | 302/49 |
| 3,115,278 | 12/1963 | Mylting | 222/56 |
| 3,172,175 | 3/1965 | Hartley | 22/89 |
| 3,181,482 | 5/1965 | Heth | 107/4 |
| 3,219,046 | 11/1965 | Waugh | 137/8 |
| 3,245,584 | 4/1966 | Linville | 222/57 |
| 3,270,921 | 9/1966 | Nadolske et al. | 222/132 |
| 3,329,313 | 7/1967 | Mayer | 222/58 |
| 3,410,293 | 11/1968 | Ernyei | 137/112 |
| 3,452,774 | 7/1969 | Stanton | 137/101.19 |
| 3,475,392 | 10/1969 | McCoy et al. | 260/83.7 |
| 3,481,544 | 12/1969 | Jackson | 239/130 |
| 3,536,235 | 10/1970 | Holzhauer et al. | 222/273 |
| 3,558,017 | 1/1971 | Soojian et al. | 222/342 |
| 3,605,775 | 9/1971 | Zaander et al. | 137/5 |
| 3,606,036 | 9/1971 | Beebe et al. | 214/14 |
| 3,606,903 | 9/1971 | Porter et al. | 137/88 |
| 3,609,316 | 9/1971 | Brossett et al. | 235/151.2 |
| 3,625,724 | 12/1971 | Alvero | 106/87 |
| 3,670,923 | 6/1972 | Hawes, Jr. et al. | 222/2 |
| 3,721,253 | 3/1973 | Remke | 137/3 |
| 3,807,602 | 4/1974 | Meichsner | 222/1 |

(List continued on next page.)

FOREIGN PATENT DOCUMENTS 637629 3/1962 Canada .
1064761 4/1967 United Kingdom .

OTHER PUBLICATIONS

"Programmable Optimum Density (POD) Blender" described in a brochure entitled Precision Meets Dependability for the Perfect Mix, (TSL-5011, IC-N-101675000), from Dowell Schlumberger; date unknown.

Advertisement from Petroleum Management headed "The POD has Landed" Bulletin of the University of Utah, Nov., 1964, Storage and Flow of Solids, by Andrew W. Jenike.

Prior Public Uses of Subject Matter Disclosed in U.S. Patent Application Ser. No. 757,032 filed Jul. 19, 1985, abandoned.

Prior Public Uses of Subject Matter Disclosed in U.S. Patent Application Ser. No. 894,440 filed Jul. 31, 1986, U.S. Pat. No. 4,701,095.

Primary Examiner—Joseph Ruggiero
Attorney, Agent, or Firm—James R. Duzan; E. Harrison Gilbert, III

[57] ABSTRACT

A control system is provided which can be retrofit to existing conventional blender devices, such as a blender trailer used for combining a pregelled liquid with a solid particulate additive at a well site. The control is provided either manually or automatically from a remote location where a display unit and a computer unit of the invention are located, such as in a frac van. The display unit and the computer unit are connected together by a multi-conductor cable, and the display unit is connected by a multi-conductor cable to a terminal unit mounted on the blender. Control signals are output from the display unit, under automatic control by the computer unit or under manual control by potentiometers attached to the display unit, to control electrohydraulic valves associated with screw conveyors mounted on the blender. Linear variable differential transformer signals from the electrohydraulic valves, rotational speed signals from the screw conveyors, and flow rate signals from the inlet pregelled liquid are communicated to the display unit for use by it and the computer unit in generating the valve control signals.

17 Claims, 15 Drawing Sheets

U.S. PATENT DOCUMENTS

| | | | |
|---|---|---|---|
| 3,822,809 | 7/1974 | Foucault et al. | 222/71 |
| 3,843,099 | 10/1974 | Duncan | 259/23 |
| 3,964,793 | 6/1976 | Volpeliere | 302/3 |
| 4,111,272 | 9/1978 | Ricciardi et al. | 177/50 |
| 4,111,335 | 9/1978 | Arya et al. | 222/57 |
| 4,111,336 | 9/1978 | Ward et al. | 222/58 |
| 4,209,258 | 6/1980 | Oakes | 366/138 |
| 4,265,266 | 5/1981 | Kierbow et al. | 137/101.19 |
| 4,265,858 | 5/1981 | Crum et al. | 366/152 X |
| 4,304,493 | 12/1981 | Frankie | 366/20 |
| 4,353,482 | 10/1982 | Tomlinson et al. | 222/1 |
| 4,397,561 | 8/1983 | Strong et al. | 366/151 X |
| 4,410,106 | 10/1983 | Kierbow et al. | 222/135 |
| 4,427,133 | 1/1984 | Kierbow et al. | 222/77 |
| 4,453,829 | 6/1984 | Althouse, III | 366/13 |
| 4,498,783 | 2/1985 | Rudolph | 366/132 |
| 4,527,245 | 7/1985 | Axelson, Jr. et al. | 364/479 X |
| 4,538,221 | 8/1985 | Crain et al. | 364/172 |
| 4,538,222 | 8/1985 | Crain et al. | 364/172 |
| 4,579,458 | 4/1986 | Ohlson | 366/8 |

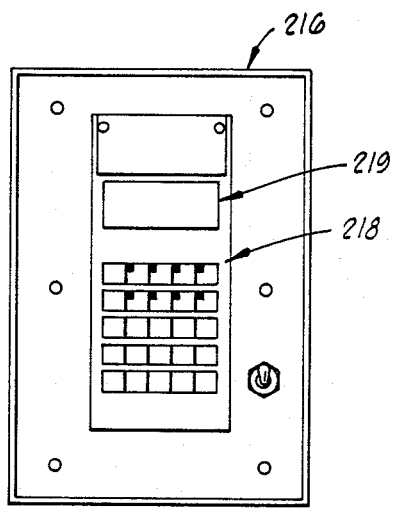 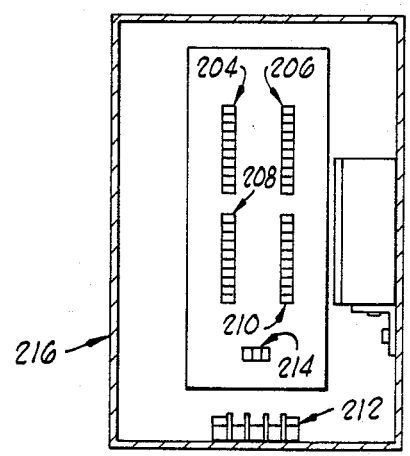
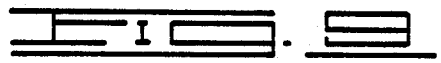 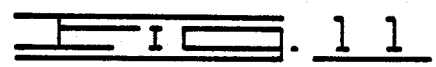
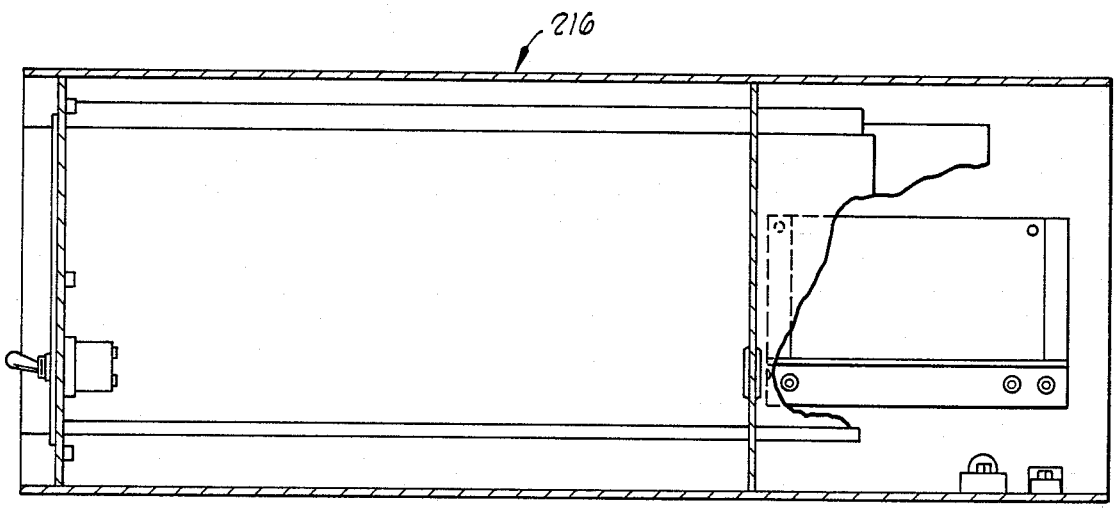
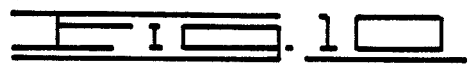

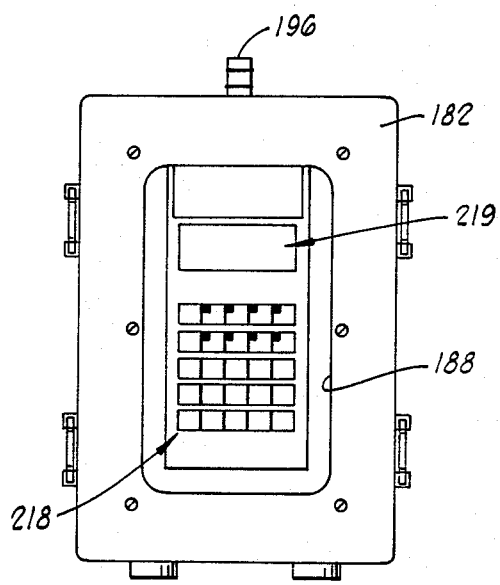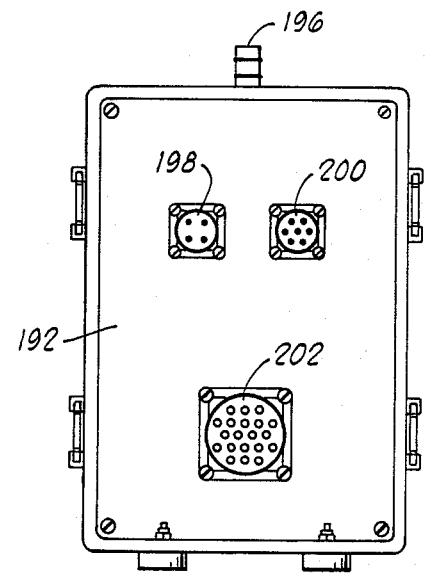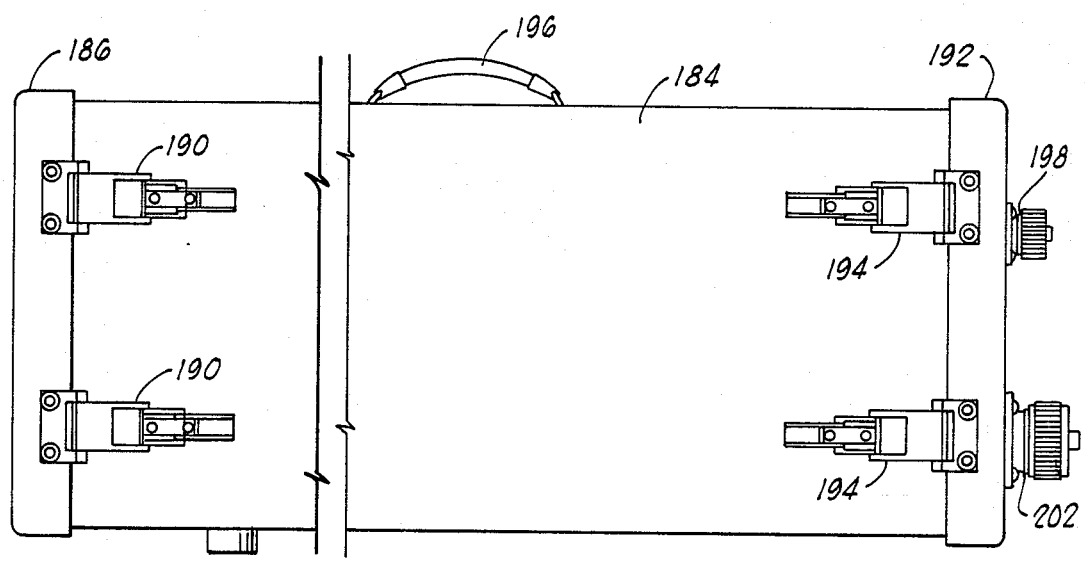

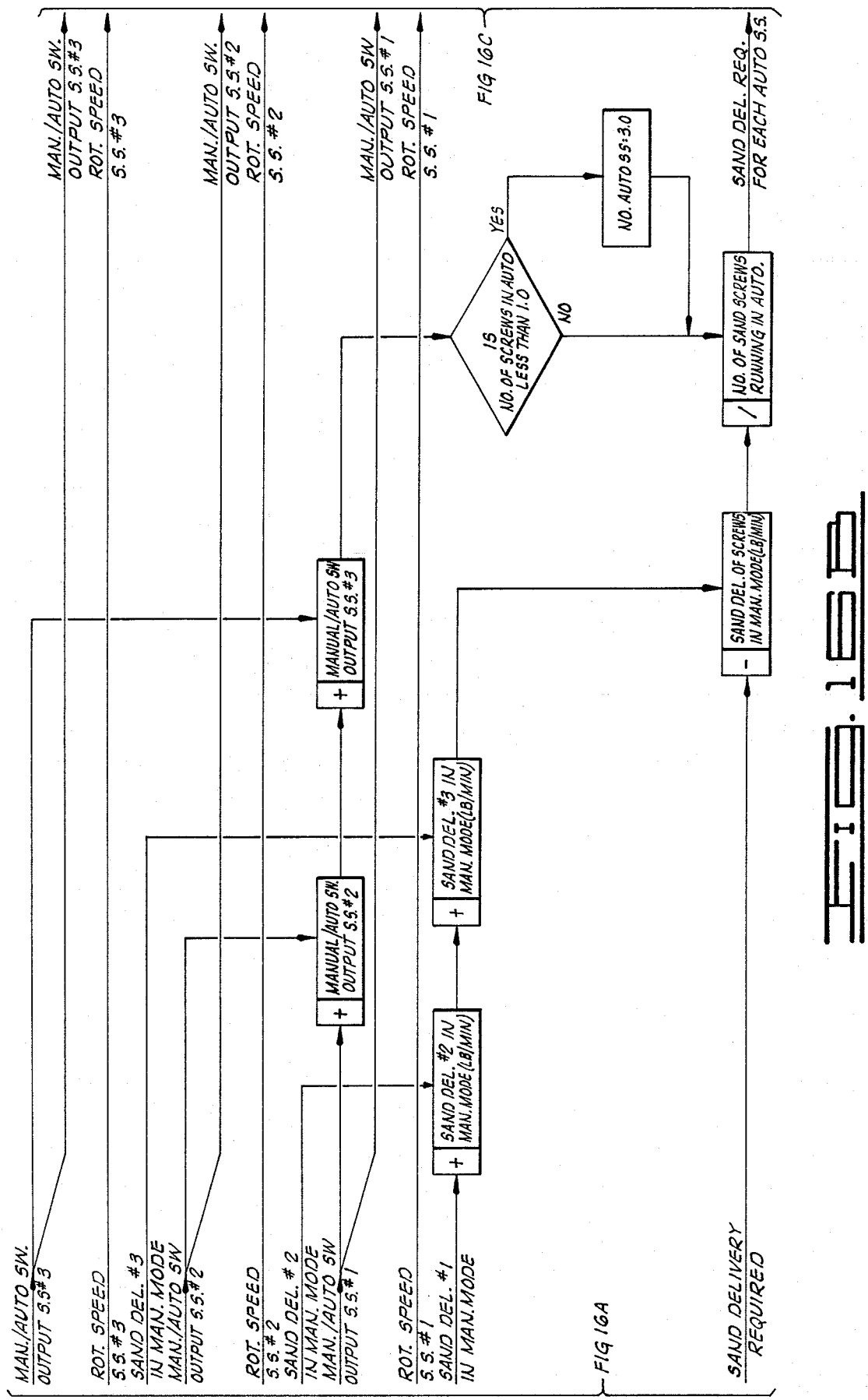

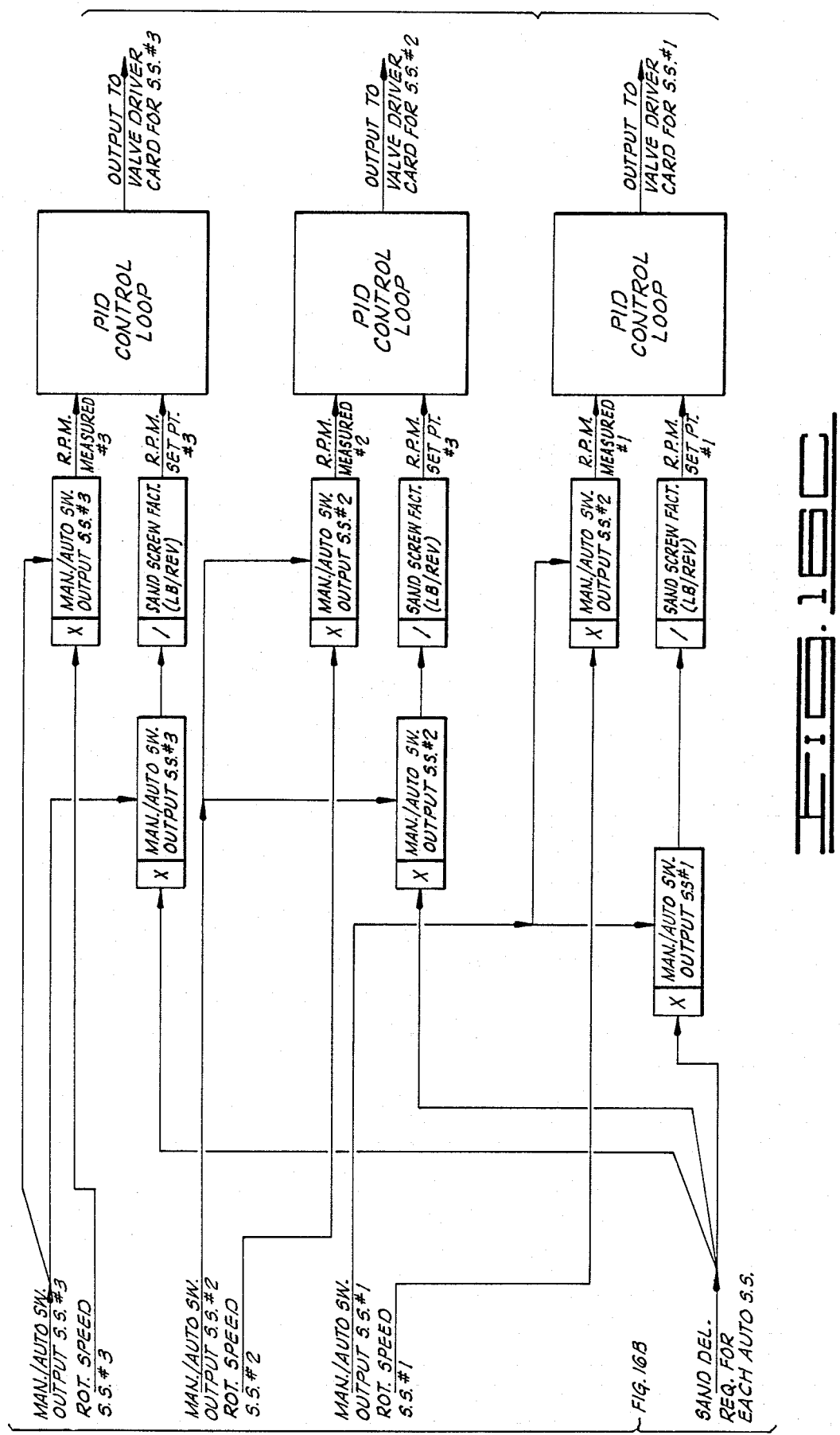

AUTOMATIC DENSITY CONTROL SYSTEM FOR BLENDING OPERATION

BACKGROUND OF THE INVENTION

This invention relates generally to apparatus for controlling the blending of a solid substance with a liquid substance and more particularly, but not by way of limitation, to apparatus for remotely manually or automatically controlling, from a frac van, the delivery, via a screw conveyor, of a solid particulate additive into a mixing tank into which a pregelled liquid is concurrently flowed so that a fracturing slurry having a desired density is provided at the output of the mixing tank.

Various techniques or systems are used in the oil industry for increasing the production of oil or gas wells. One method used for stimulating a well is known as "hydraulic fracturing". During a typical hydraulic fracturing operation, a slurry of a viscous base fluid and a solid particulate material, particularly referred to as a proppant, is pumped downhole at sufficient pressures to fracture open the well's producing formation. Once a fracture has been created, the pumping of the slurry is preferably continued until a sufficient volume of the solid proppant has been carried by the slurry into the formation. After a suitable time, the pumping operation is stopped whereupon the fracture closes only so far as allowed by the proppant residue, thereby propping open the fracture in the formation. Thus, the effective flow area from the producing formation has been enlarged, thereby increasing the well's production.

During such a fracturing operation, it is important that the correct amount of the solid propping material be blended with the base fluid to form a slurry having the desired fluid density, which density results from the concentration of the proppant added to the base fluid. If the proppant concentration of the fracturing slurry is less than is needed, the height and depth of the fracture created in the producing zone will be less than desired, thereby reducing the effectiveness of the fracturing operation. If the proppant concentration of the fracturing slurry is greater than is needed, the excess proppant may plug the fracture closed at the well bore (referred to as "screen out"), thereby prematurely ending the fracturing operation and perhaps damaging, rather than enhancing, the well's production.

When such a fracturing operation is currently done with a standard blending trailer, such as of a type used by Halliburton Services, a manual control system is used by the operator of the blender to ratio the delivery of the proppant and the base fluid entering the mixing tub to try to obtain a slurry with the correct proppant concentration and thus the correct slurry density. Using this manual control system, the blender operator watches a meter indicating the flow rate of the base fluid and manually adjusts a control to vary the proppant delivery rate in a manner to match the needle position of a sand delivery rate meter with the needle position of a clean flow rate meter. This manual adjustment can be required constantly if the base fluid delivery rate is constantly fluctuating, which can easily result from a fluctuating downhole flow rate of the slurry or a fluctuating base fluid flow rate brought about by an automatic fluid level control system controlling the fluid level in the mixing tub, for example. If the fluctuations are rapid enough or if several proppant delivery devices are simultaneously controlled, an operator trying to make such manual changes in the proppant delivery rate or rates may be unable to make them fast enough to produce optimum concentrations of the proppant in the resultant slurry. Furthermore, it is difficult for an operator to control manually the proppant to obtain desired variations in concentrations over time, such as may be required for ramped or curvilinear concentrations needed to implement an optimally designed fracturing operation. Therefore, under manual control, the resultant slurry may have too low or too high a concentration of proppant which can thereby decrease the effectiveness of the fracturing operation or under extreme circumstances cause a screen out. In general, the quality of the slurry may be less than optimum in such a manually controlled fracturing operation.

In a type of fracturing control system which relies primarily on a density reading provided from a densimeter connected into the outlet flow line from the mixing tub, an optimally designed fracturing program requiring ramped or curvilinear responses is difficult to implement because the density reading yields information having a time lag relative to the quantity of proppant then being added at the time the density reading is being given. That is, control based on a signal derived from a flow out of the mixing tub has an inherent time lag because by the time the outlet flow is monitored, more blending has already occurred in the mixing tub. Therefore, a control system based on monitoring an outlet flow from the mixing tub is less responsive than a control system based on monitoring the flow into the mixing tub.

In view of these shortcomings resulting from manual control or outlet density control of a standard blender, there is the need for an improved control system which can more accurately maintain a constant proppant concentration in a fracturing slurry regardless of the fluctuations in the base fluid, thereby providing a slurry with a constant density. The system should be constructed so that multiple concentration set points can be implemented to change the proppant concentration whereby ramped or curvilinear responses can be implemented. The system should be capable of operation from a remote location in either an automatic mode or a manual mode. The system should be designed so that it can be retrofitted to a preexisting blender. To accommodate density readings in fine-tuning the primary control of the proppant delivery rate based on the inlet flow, the improved system should also be capable of use with a slurry density measuring device.

SUMMARY OF THE INVENTION

By providing a novel and improved density control system, the present invention overcomes the above-noted and other shortcomings related to manually controlling a standard blender. The present invention is used to maintain a constant proppant concentration in a fracturing slurry regardless of fluctuations in the downhole pumping rate or the base fluid flow rate. The present invention is adapted for use with a slurry density measuring device so that the system can then maintain the exact desired proppant concentration regardless of changes in the accuracy of the base fluid rate measurement and the proppant delivery rate measurement. The present invention is constructed so that it can be programmed to change the proppant concentration set point to different values, such as may be required to implement a ramped or curvilinear concentration schedule in accordance with an optimally designed fracturing job. The present invention is designed so that it can be retrofitted to existing fracturing blenders. The invention allows automatic computer control or manual operator control to be selected and implemented remotely from the blender equipment. This is preferably implemented in parallel across the blender's normal proppant delivery system manual control to facilitate the retrofitting and to allow the standard manual control system to be used as a back-up if needed. Although the invention is described herein with specific reference to its use with a standard blender in the oil and gas industry where mixing equipment is used to blend a base fluid and particulate material to form a slurry, it is contemplated that the present invention could be adapted for use in other industries.

Within the context of the oil and gas industry, the present invention provides retrofit apparatus for controlling the blending of a solid substance with a liquid substance, which apparatus comprises: a multiple-conductor electrical cable; local terminal means, adapted for mounting on a conventional blender previously manufactured for use at a well site, for connecting respective ones of the conductors at one end of the cable to respective components mounted on the blender; and control means, adapted for mounting at a location within the vicinity of the well site but spaced from the blender and adapted for connecting to the respective ones of the conductors at the other end of the cable, for providing control signals through conductors of the cable in response to signals received by the control means through other conductors of the cable from the components of the blender connected by the terminal means to the cable, which control signals control the amount of the solid substance added to the liquid substance.

Therefore, from the foregoing, it is a general object of the present invention to provide a novel and improved density control system. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 9 is a front elevational view of a computer forming part of a computer unit of the preferred embodiment of the present invention.

FIG. 10 is a sectional side elevational view of the computer shown in FIG. 9.

FIG. 11 is a rear elevational view of the computer shown in FIG. 9.

FIG. 12 is a front elevational view showing the computer contained in a housing of the computer unit of the preferred embodiment of the present invention.

FIG. 13 is a shortened side elevational view of the housing.

FIG. 14 is a rear elevational view of the housing showing connector mounts.

FIGS. 16A–16C depict a flow chart of the program implemented in the computer for obtaining automatic control of the proppant to be delivered by the conventional blender.

DETAILED DESCRIPTION OF THE PREFERRED EMBODIMENT

Figure 1:
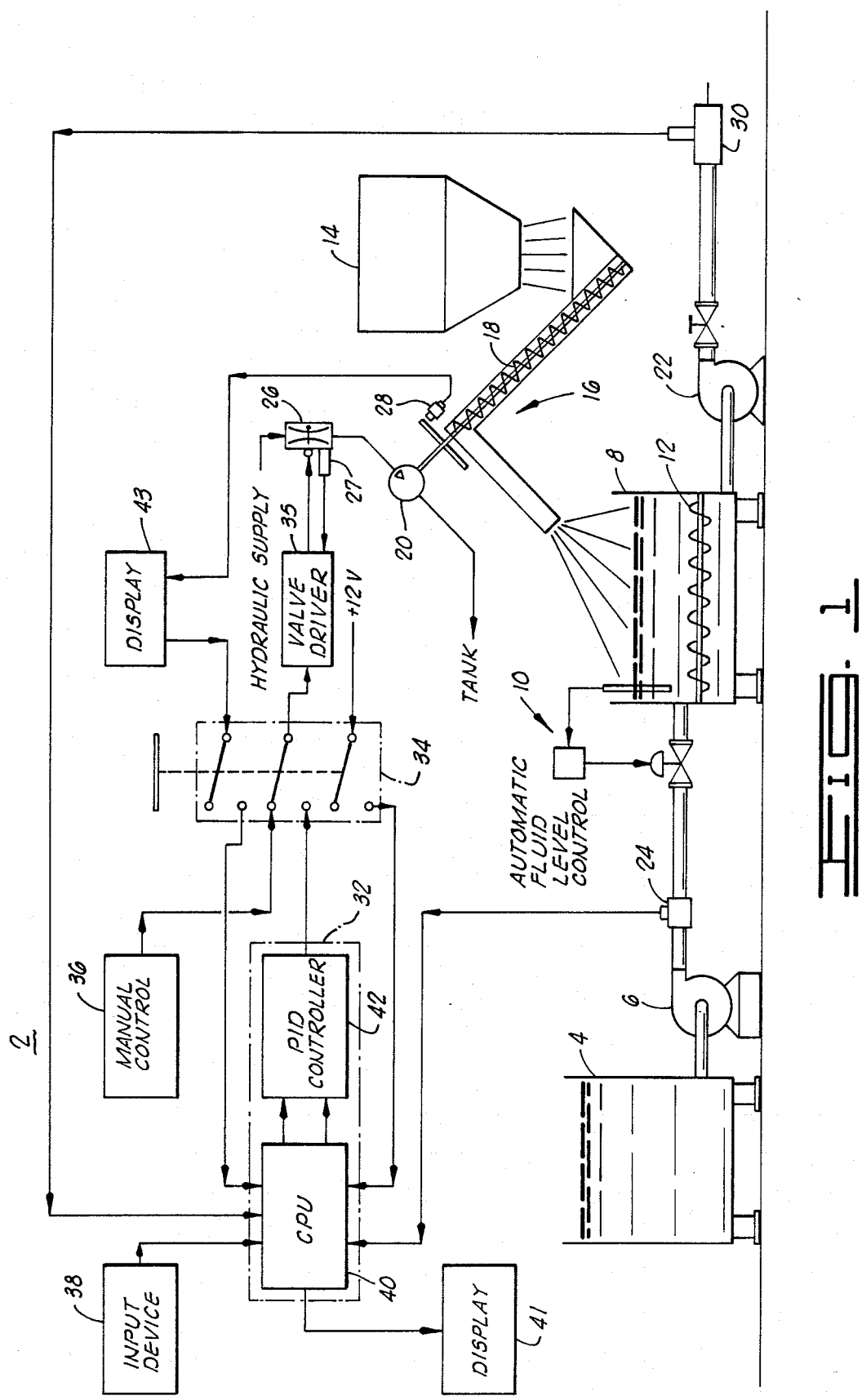
FIG. 1 is a schematic illustration of the present invention adapted to be retrofit with a conventional fracturing slurry blender.

A control system 2 of the present invention is schematically illustrated in FIG. 1. The control system 2 is associated with a conventional blending system, such as one which has been previously manufactured for use at a well site and to which the control system 2 is to be retrofit. Such a blending system includes pre-existing components such as a reservoir 4 of a base or primary fluid which is pumped by a pump 6 into an inlet of a mixing container or tank 8 having an automatic fluid level control system 10 and an agitator or mixing mechanism 12. The blending system also includes a bin or tank 14 which contains a solid particulate additive delivered into the mixing tank 8 by a screw conveyor 16 having a screw element 18 rotated by a hydraulic motor 20 of a hydraulic system. When the solid particulate additive is delivered into the mixing tank 8, it is mixed or blended with the concurrently flowed base fluid to form a slurry which is pumped from an outlet of the mixing tank 8 by a discharge pump 22. In a particular environment with which the control system 2 is contemplated to be used, the base fluid in the reservoir 4 is a pregelled liquid of a type known to the art and the solid particulate additive is a proppant, such as sand, so that the resultant mixture derived in the mixing tank 8 is a fracturing slurry to be pumped into a well at which the blending system and the control system 2 are located.

Other pre-existing components of the conventional blending system, or ones which can be readily connected thereto in association with the control system 2, include: a flow meter 24 (e.g., turbine flow meter, magnetic flow meter, positive displacement flow meter), connected into the fill line between the discharge of the pump 6 and the inlet of the mixing tank 8 for detecting the flow rate of the pregelled liquid flowing into the mixing tank 8 (only one flow meter is illustrated in FIG. 1; however, in a subsequently described specific implementation, two flow meters of different sizes are connected in parallel into the location of the flow meter 24 and one of the two flow meters is selected through a flow switching arrangement of a type as known to the art); and a transducer 28, such as a magnetic pickup or generator, for detecting the rotational speed of the screw element 18 of the screw conveyor 16. Another element, which can be optionally used with the control system 2, is a slurry density measuring device 30 connected to the discharge line extending from the outlet of the pump 22. The devices 24, 28, 30 provide respective electrical singals to which the control system 2 is responsive as more particularly described hereinbelow. These elements are of suitable types known to the art and are commercially available.

Forming part of the preferred embodiment of the control system 2 because it is added to the conventional blending system, but serving an interfacing function somewhat similar to some of the aforementioned pre-existing components, is an electrohydraulic (or other suitable type) control valve 26 (e.g., a Parker proportional valve) connected into the motor 20 hydraulic system's supply line through which a high pressure fluid is provided for driving the hydraulic pump 20 and thus for driving the screw element 18. In the preferred embodiment the electrohydraulic valve 26 has a linear variable differential transformer (LVDT) 27 associated therewith for generating an electrical signal indicating the operating state or condition of the valve 26. The LVDT 27 is not a mandatory feature of the present invention. For example, if a specific implementation of the valve 26 is of a suitable type which moves to consistent positions each time, no LVDT will be needed. Even with such an accurately operating valve, however, an LVDT is useful because, over time, even such valves experience wear which can change the manner in which the valves operate. Although such change can ultimately be compensated for by the operation of the present invention, use of an LVDT will expedite this response. The valve 26 receives a control signal from another part of the control system 2 so that the valve 26 is controlled to adjust the flow of the driving fluid for the motor 20 and thus to adjust the rotational speed of the screw element 18 and, thereby, the quantity of the solid particulate additive delivered into the mixing tank 8, which controls the concentration of the additive in the resultant blend and which thus also controls the density of such resultant blend. The LVDT 27 also provides a signal to which another part of the control system 2 is responsive as subsequently described. The valve 26 and the LVDT 27 are of suitable types known to the art and commercially available.

The control system 2 is depicted in FIG. 1 as also comprising a computer 32 for providing automatic control signals which can be switched by a switch 34 to an input of a valve driver circuit 35, from which a valve control signal is provided to the electrohydraulic valve 26 so that the speed of the screw element 18 is thereby automatically controlled. The control system 2 also includes a manual control 36 which can be switched through the switch 34 to provide manual control of the valve driver circuit 35 and thus the valve 26.

The computer 32 responds to entries made through an input device 38 (such as a keypad) and to electrical signals from the flow meter 24 (indicating the inlet flow rate of the base fluid), from the transducer 28 (indicating the rotational speed of the screw element 18), and from the switch 34 (indicating whether it is in a manual position or an automatic position). The computer 32 is shown in FIG. 1 as including a microprocessor based central processing unit (CPU) 40 which controls a proportional integral and derivative (PID) controller 42 from which the automatically generated valve drive control signal for the valve drive circuit 35 is provided. The valve driver 35 also receives electrical signals from the linear variable differential transformer 27 associated with the valve 26 (for indicating the status of the valve 26). The elements 40, 42 are of suitable types known to the art and commercially available as more particularly described hereinbelow and can be implemented in other configurations (e.g., the PID controller 42 can be implemented in software in a CPU 40 of a suitable type). Associated with the CPU 40 is a display 41 which allows an operator to observe data entries, operations, etc., related to the CPU 40.

Figure 8A:
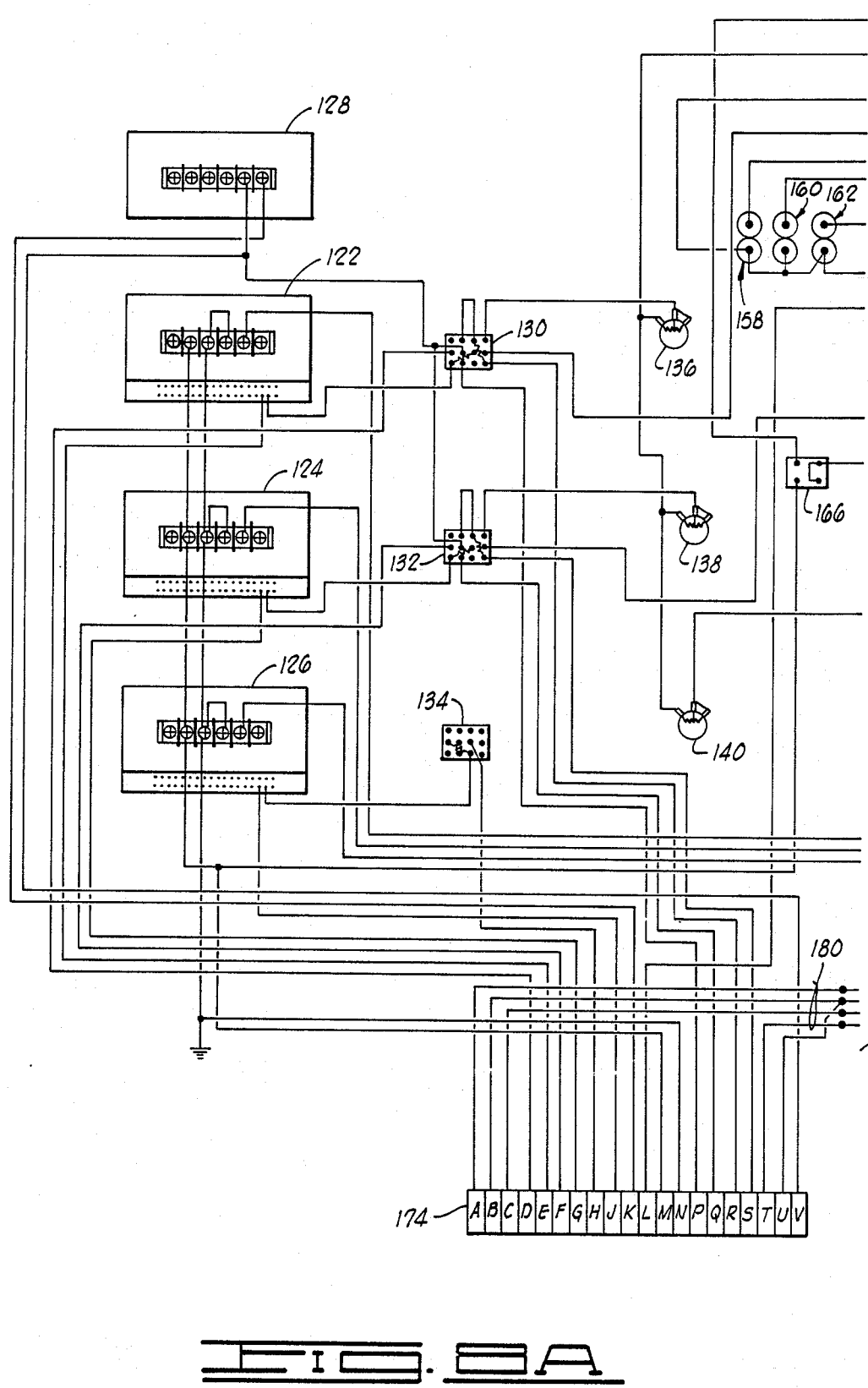
FIGS. 8A–8B are a wiring diagram of the display unit.
Figure 8B:
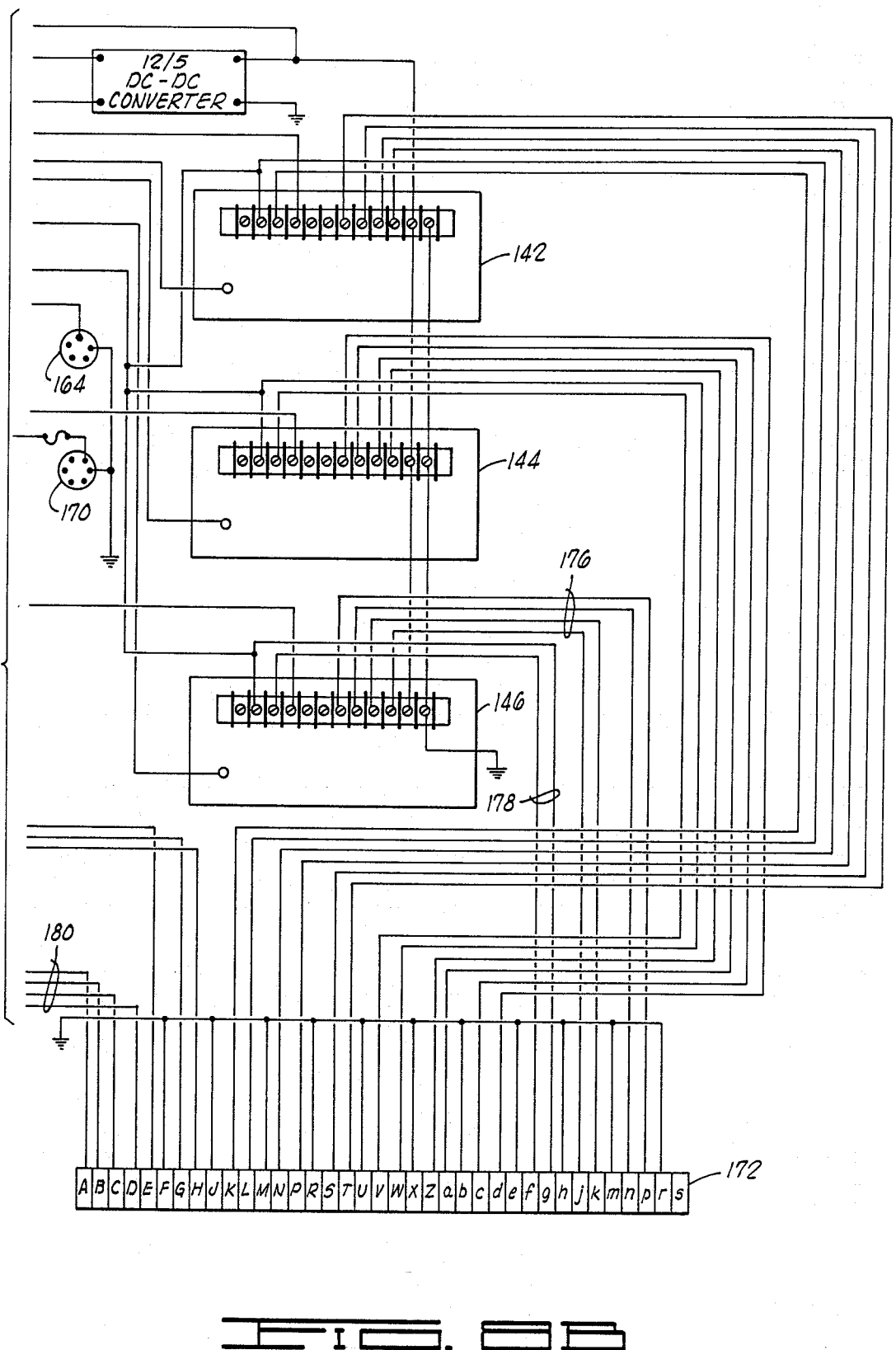
Figure 15:
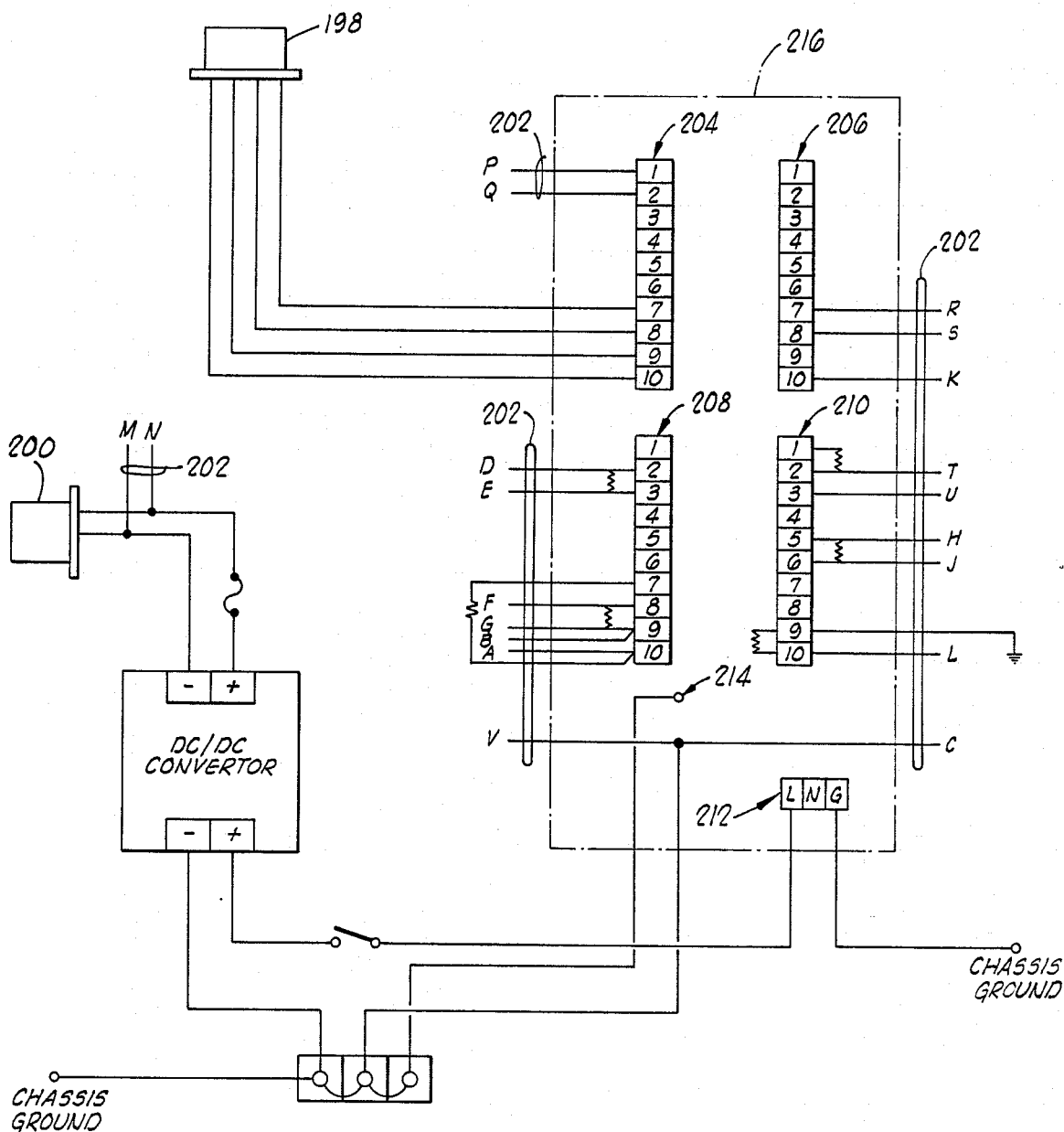
FIG. 15 is a wiring diagram of the computer unit.

Also included in the control system 2 is a visual display 43 through which the speed of the screw element 18 is shown. In FIG. 1 the display 43 is shown connected in line in that the signal from the transducer 28 passes through the display 43 before being received at the switch 34. A particular design by which this is implemented is shown in FIGS. 8A-8B. The display 43 can, however, be designed to be connected in parallel so that the transducer 28 signal does not have to pass through the display 43 for it to be received at the switch 34.

Figure 2:
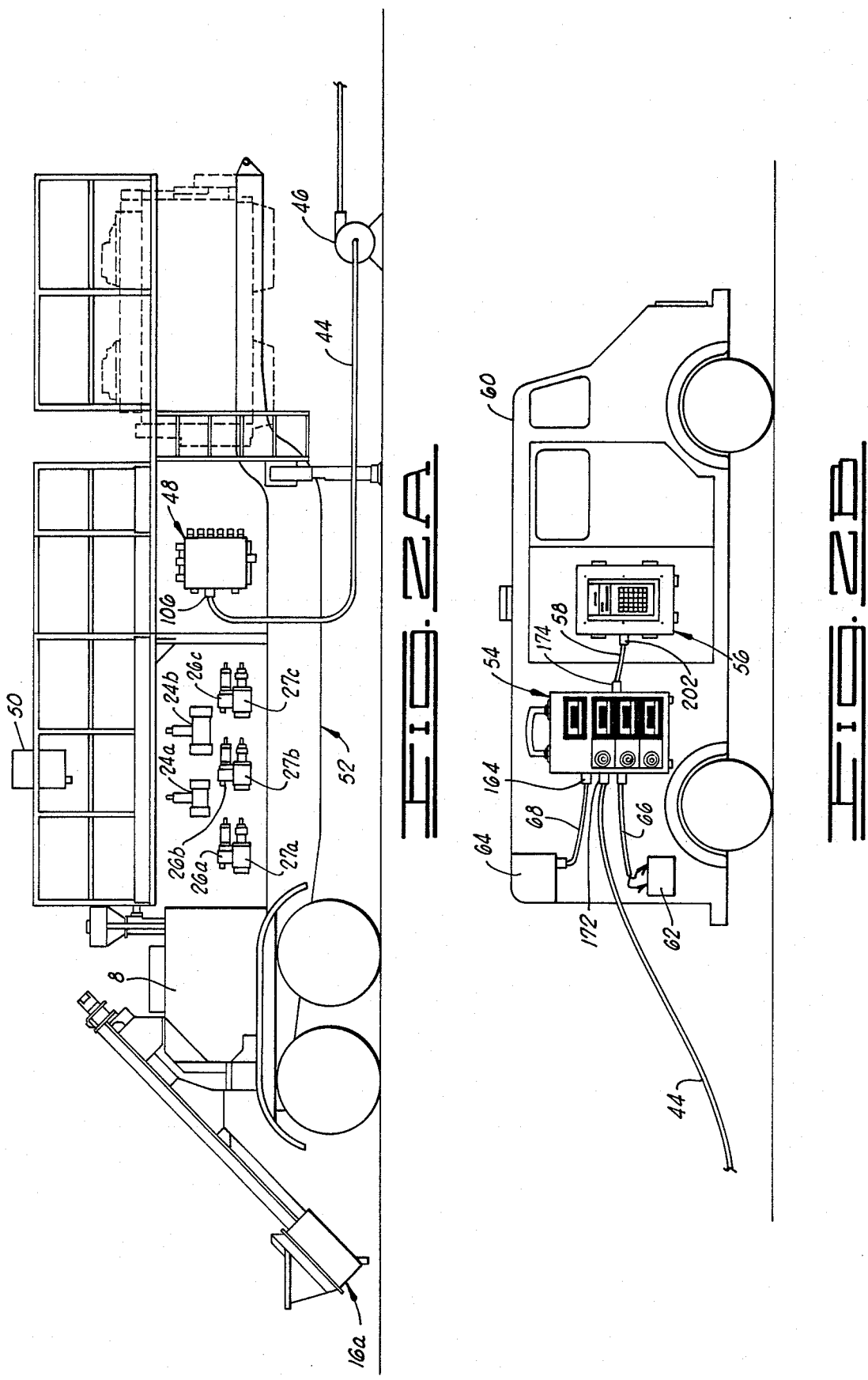
FIGS. 2A–2B are an illustration of a preferred embodiment implementing the present invention illustrated in FIG. 1.

A particular implementation of the control system 2 schematically depicted in FIG. 1 will be described with reference to FIGS. 2-16. The control system 2 represented in FIGS. 2A-2B (collectively referred to as FIG. 2) includes a multiple-conductor electrical cable 44, such as one which can be readily reeled onto and unreeled from a reel 46. The control system 2 also includes local terminal means 48 for connecting respective ones of the conductors at one end of the cable 44 to respective ones of the pre-existing or added interfacing components, such as those identified in FIG. 1. More particularly with reference to the FIG. 2 illustration, these components include turbine flow meters 24a, 24b, either of which can be used as the flow meter 24 illustrated in FIG. 1. These components also include three electrohydraulic control valves 26a, 26b, 26c, each of which is to be associated with a respective screw conveyor used in the particular embodiment described with reference to FIG. 2. Associated with each of these valves is a respective LVDT 27a, 27b, 27c. A match meter device 50 of the type manufactured by Halliburton Services is also shown in FIG. 2 as being one of the pre-existing components of the blender system illustrated therein. The match meter device 50 is part of the pre-existing manual control system mounted on the blender system. The three signals representative of the respective rotational speeds of the three screw conveyors used in the configuration described with reference to FIG. 2 come from respective transducers 28 (not shown in FIG. 2) connected to the match meter 50 in a manner known to the art. The match meter 50 provides a convenient connection point for the signals provided by the transducers 28.

Another component of the blender system illustrated with reference to FIG. 2 is a portable, wheeled trailer 52 upon which the aforementioned elements are suitably mounted. In particular, the flow meters 24a, 24b are connected in parallel into the inlet line which connects to the mixing tank 8 shown mounted near the rear of the trailer 52 adjacent which the three screw conveyors are mounted on the trailer 52 (one of which conveyors is shown and identified by the reference numeral 16a). The valves 26a, 26b, 26c are installed in the high pressure hydraulic fluid supply system connected to the respective motors driving the screw elements of the screw conveyors mounted on the trailer 52. The match meter 50 is mounted and connected so that it receives inputs from transducers associated with the screw elements of the screw conveyors, in correspondence to the transducer 28 shown in FIG. 1.

In addition to the valves 26/LVDT 27, the cable 44 and the local termination means 48, the control system 2 represented in FIG. 2 includes control means for providing control signals through conductors of the cable 44 in response to signals received by the control means through other conductors of the cable 44 from the aforementioned blender trailer 52 components connected by the terminal means 48 to the cable 44. These control signals are used for controlling the amount of the solid substance added, via the screw conveyors 16, to the liquid substance flowed into the mixing tank 8. This control means is adapted for mounting at a location within the vicinity of the well site where the blender trailer 52 is located, but spaced from the blender so that control of the blender is remotely provided. The control means is also adapted for connecting to respective ones of the conductors at the other end of the cable 44. This connection is made at a display unit 54 forming one part of the control means. Forming another part of the control means is a computer unit 56 electrically connected to the display unit 54 by an electrical cable 58. The display unit 54 and the computer unit 56 are particularly adapted for mounting in a vehicle 60, such as one referred to as a frac van having a suitable power source 62 (such as a 12 VDC battery) and an overhead display 64, both of which are shown connected to the display unit 54 by respective electrical cables 66, 68. Although not shown, the overhead display 64 is typically connected through a strip chart recorder to the densimeter 30 so that the density signal is made available to the display unit 54 through the cable 68.

Figure 3:
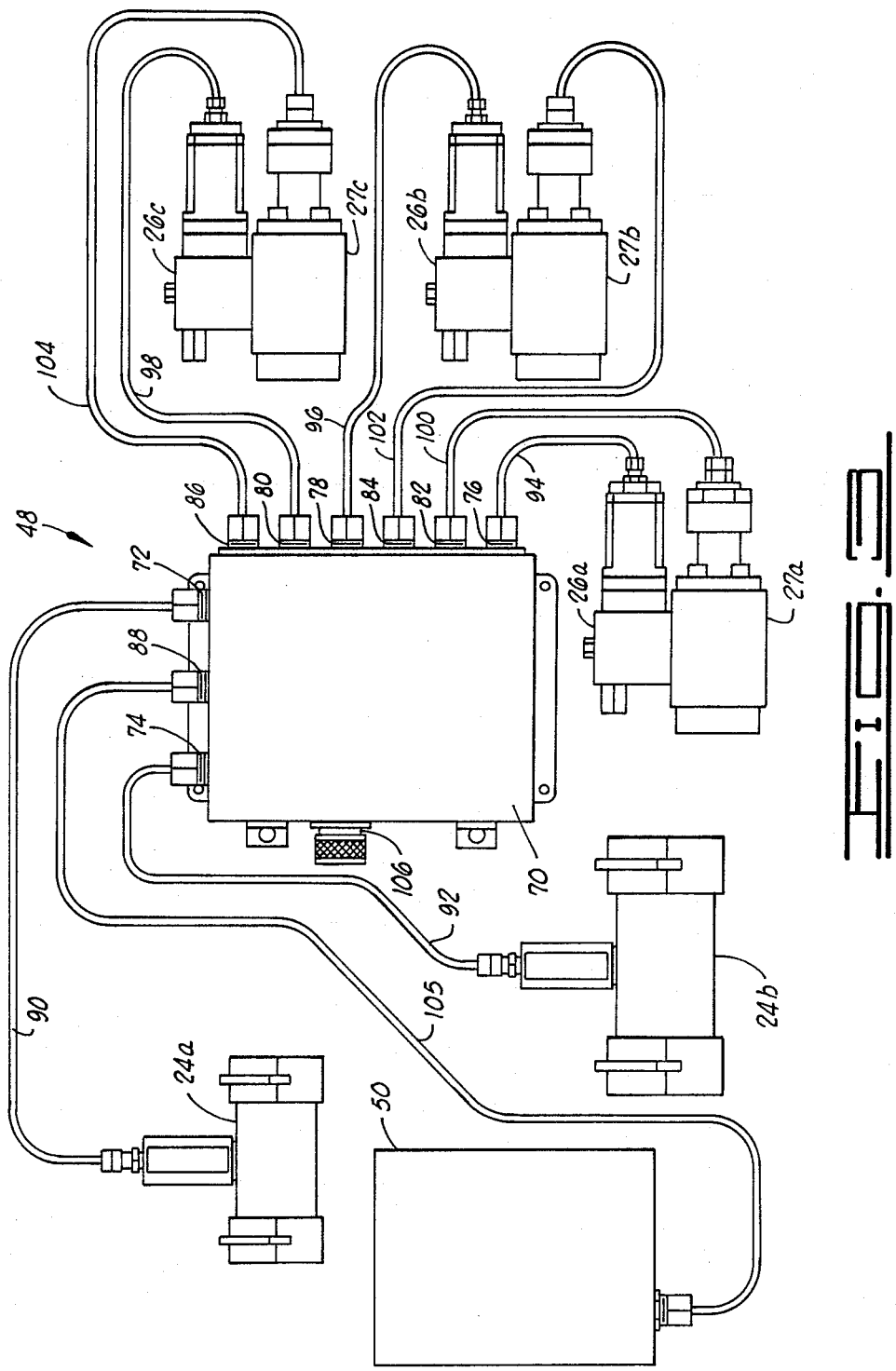
FIG. 3 illustrates a local terminal portion of the preferred embodiment of the present invention shown connected to pre-existing components of a conventional blender.

The local terminal means 48 will be more particularly described with reference to FIGS. 3 and 4; thereafter, the display unit 54 will be more particularly described with reference to FIGS. 5-8, and the computer unit 56 will be more particularly described with reference to FIGS. 9-15. The operation of the control system 2 will then be described with particular reference to FIGS. 16A-16C.

The local terminal means 48 provides connector terminals by which the various components or elements on the blender trailer 52 can be connected and electrically routed to respective ones of the conductors bundled in the single cable 44. This central connection feature of the terminal means 48 is illustrated in FIG. 3 wherein the means 44 is shown as including a housing 70 to which are attached connectors (such as threaded hubs with associated feedthroughs) 72, 74, 76, 78, 80, 82, 84, 86, 88. Electrical signals generated by the flow meters 24a, 24b are routed through the connectors 72, 74, respectively, on respective electrical conductors 90, 92. Each of the connectors 76, 78, 80 receives a respective one of electrical conductors 94, 96, 98 connected to the electrohydraulic valves 26a, 26b, 26c, respectively, so that the control signals for the valves can be transferred through these conductors to the respective valves. The connectors 82, 84, 86 receive electrical conductors 100, 102, 103, respectively, connected to the LVDT's 27a, 27b, 27c, respectively, so that the valve status signals generated by the LVDT's are provided thereby to the terminal means 48. The signals conveniently tapped off the match meter 50 are routed through the connector 88 over a cable 105.

The housing 70 also has attached thereto another connector, identified by the reference numeral 106. The connector 106 is adapted to be mechanically and electrically connected to the end of the cable 44 to which the terminal means 48 is connected, as illustrated in FIG. 2. The connector 106 has a threaded hub to which the cable is mechanically connected, and the connector 106 has electrical terminals or contacts to which the individual conductors of the cable 44 couple when the cable 44 is mechanically connected to the hub of the mount 106.

Contained within the housing 70 is interconnect means for connecting the wiring routed through the connectors 72-88 to the connector 106 so that the electrical signals of the various transducers defined by or associated with the flow meters 24a, 24b, the LVDT's 27a, 27b, 27c and the screw conveyors 16 are communicated to respective conductors of the cable 44 and so that the control signals from the control means located in the frac van 60 are communicated from respective conductors of the cable 44 to the valves 26a, 26b, 26c connected by their respective cables through the connectors 76, 78, 80, respectively. That is, this interconnect means electrically communicates the various wires routed through the connectors 72-88 with respective ones of the contacts or terminals of the connector 106 so that the flow rate indicating signals from the flow meters, the rotational speed indicating signals from the transducers associated with the screw elements of the screw conveyors as connected to the match meter 50, and the LVDT signals are thereby coupled to the cable 44 and the ultimate valve control signals generated by the equipment shown in FIG. 2 as located on the frac van 60 are communicated to the wires to which the valves are connected. The preferred embodiment of this interconnect means is illustrated in FIG. 4.

Figure 4:
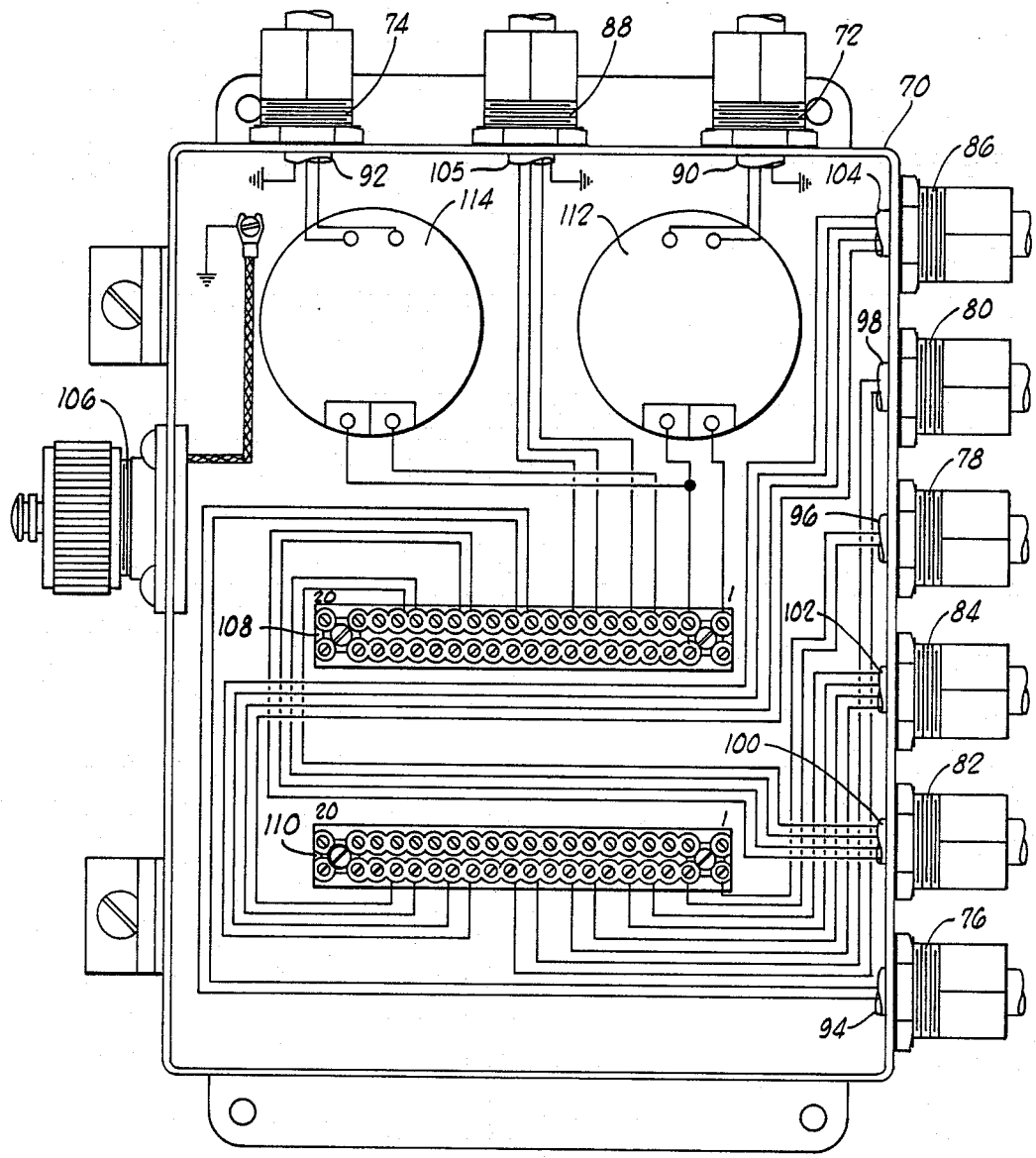
FIG. 4 is a wiring diagram for the local terminal portion shown in FIG. 3.

As shown in FIG. 4, the interconnect means includes a terminal strip 108 and a terminal strip 110 to which are connected wires of the cables routed through the connectors 72-88. Wires are also connected from the terminal strips 108, 110 to the connector 106 according to the following table, wherein the first row identifies the terminals of the terminal strip 108, the second and fourth rows identify contacts of the connector 106, and the third row identifies the terminals of the terminal strip 110 (the letter designations missing from the table are for pins which are connected to ground):

| 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|----|----|----|----|----|----|----|----|----|----|----|
| A | B |   | D | E |   | G | H |   | K  | L  |    | N  | P  |    | S  | T  |    |    |    |
| 1 | 2 | 3 | 4 | 5 | 6 | 7 | 8 | 9 | 10 | 11 | 12 | 13 | 14 | 15 | 16 | 17 | 18 | 19 | 20 |
| V | W |   | Z | a |   | c | d |   | f  | g  |    |    | j  | k  |    | n  | p  |    |    |

The interconnect means is also shown in FIG. 4 as including line amplifiers 112, 114 of suitable types known to the art and commercially available for amplifying the signals received through the connectors 72, 74 from the flow meters 24a, 24b. Each of the line amplifiers 112, 114 has two outputs, one of which is commonly connected to the corresponding one of the other, so that only three connections are shown made to the terminal strip 108 from the amplifiers 112, 114.

The connector 76 has two wires connected through it to the terminal strip 108; the connector 78 has two wires connected through it to the terminal strip 110; and the connector 80 has two wires connected through it to the terminal strip 110. The connector 82 has four wires connected through it to the terminal strip 108; the connector 84 has four wires connected through it to the terminal strip 110; and the connector 86 has four wires connected through it to the terminal strip 110. These connections are illustrated in FIG. 4.

Figure 5:
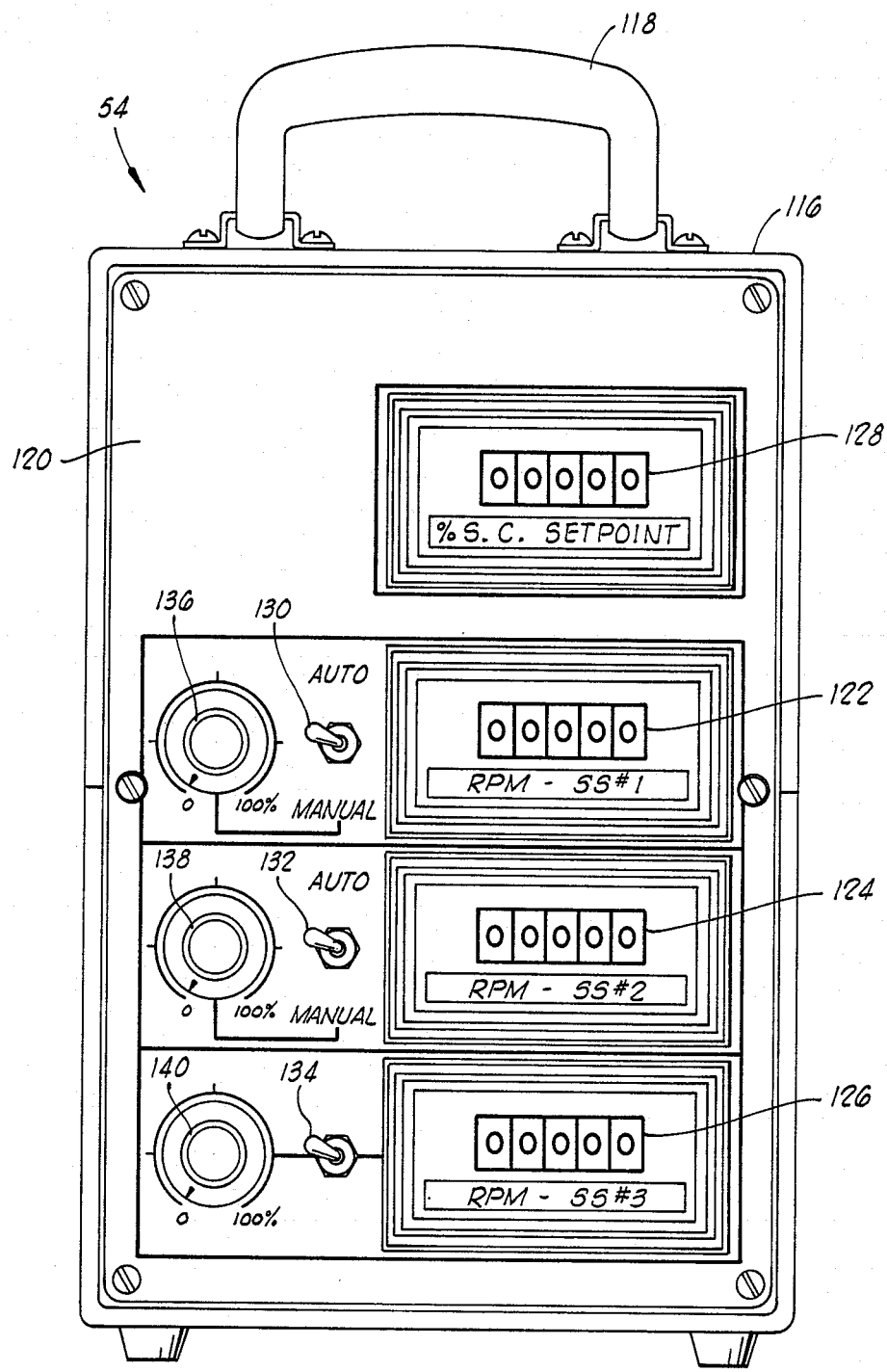
FIG. 5 is a front elevational view of a display unit of the preferred embodiment of the present invention.
Figure 6:
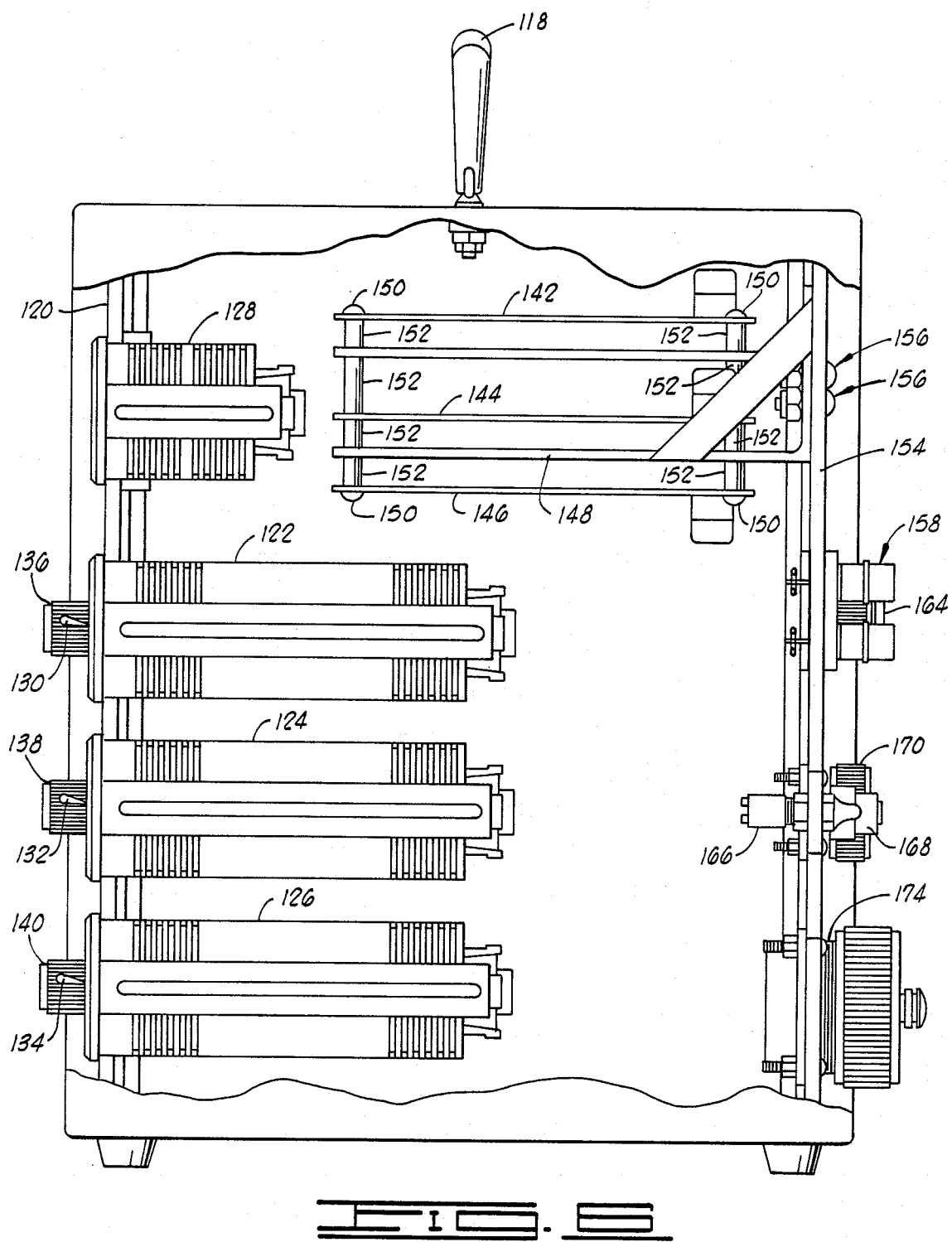
FIG. 6 is a side elevational view of the display unit with a side wall cut out to show the layout of internal parts of the display unit.
Figure 7:
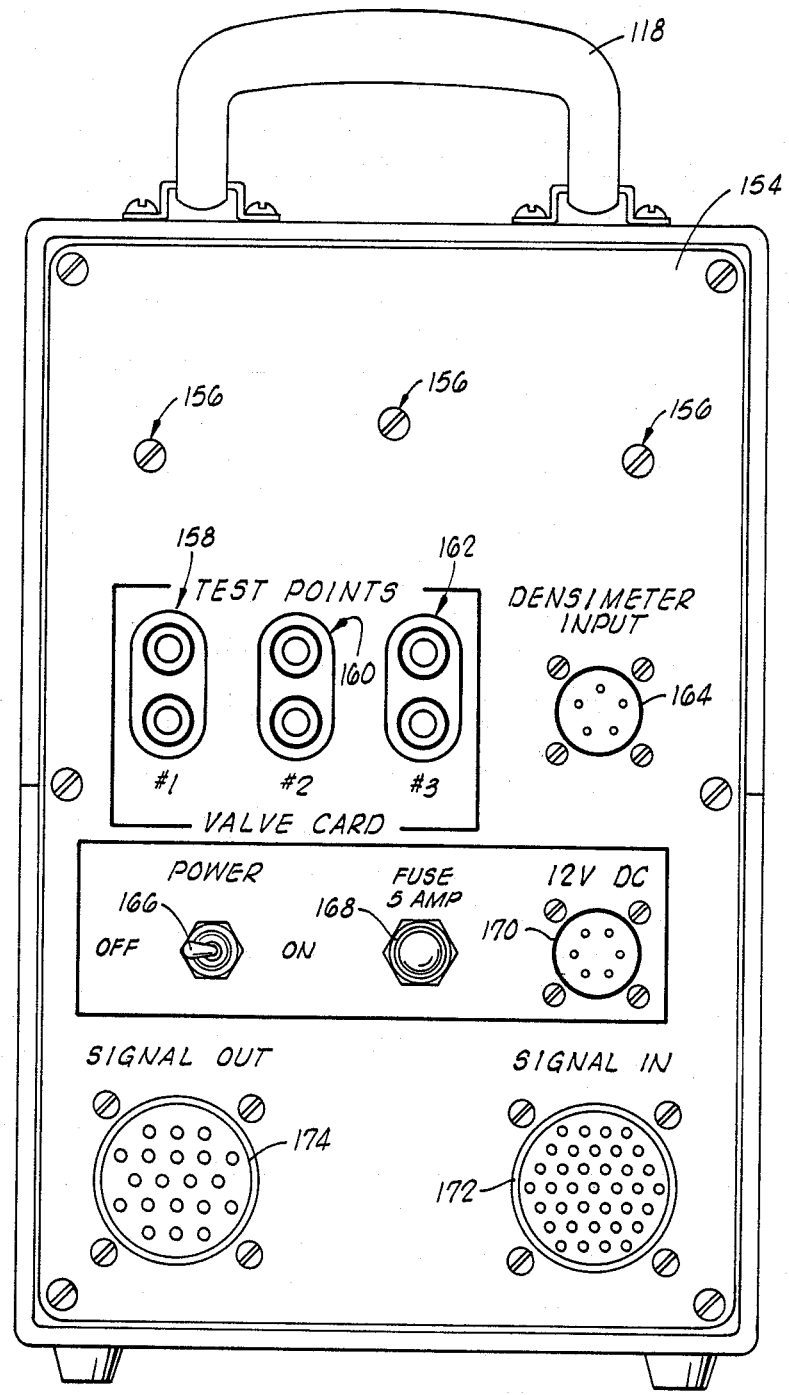
FIG. 7 is a rear elevational view of the display unit showing various connector mounts.

The display unit 54 will next be described with reference to FIGS. 5–8. In FIGS. 5–7, the display unit 54 is shown to include a housing 116 defined as a rectangularly cross-sectioned carrying case having a handle 118 at the top and designed to be disposed on the frac van 60 as illustrated in FIG. 2. The housing 116 includes a front panel or faceplate 120 to which are mounted three digital display devices 122, 124, 126 (e.g. LCD meters) corresponding to the display 43 in FIG. 1, a similar fourth digital display device 128, three toggle switches 130, 132, 134 (e.g., four pole, triple throw) corresponding to the switch 34 in FIG. 1, and three potentiometers 136, 138, 140 (e.g., 2.0K) corresponding to the manual control 36 in FIG. 1, which elements 122–140 are of suitable types known to the art and commercially available. These elements are also visible in the cut-away view of FIG. 6.

Also shown in FIG. 6 are three valve driver cards 142, 144, 146 attached to a support bracket 148 by screws 150 and standoffs 152. The cards 142, 144, 146 correspond to the valve driver 35 in FIG. 1. The support bracket 148 is connected to a back plate 154 of the housing 116 by screw/washer/nut assemblies 156 (see also FIG. 7). The valve driver cards (more specifically, printed circuit cards or boards) each contain circuitry known to the art and each is commercially available. The valve driver circuits of the preferred embodiment are used for interfacing the manually or automatically generated signals from either the potentiometers 136–140 or the computer unit 56 with the particular type of valve to be driven in response to such signals. The valve driver circuits perform this interfacing with some adjustability by being responsive also to the signals from the LVDT's 27 so that the valve driver circuits can detect if the valves have responded as intended for the interfaced control signals.

Also mounted on or attached to the rear panel 154 are three sets of test adapter connectors 158, 160, 162 wired to test points on the valve driver cards 142, 144, 146 (see FIGS. 8A–8B). The rear panel 154 also has a connector 164 to which the densimeter 30 can be connected to provide a density signal into the display unit 54 (through the display 64 and the cable 68 for the configuration depicted in FIG. 2B). Mounted below the connectors 158–164 on the back panel 154 are a toggle power on/off switch 166, a fuse holder 168, and a power input connector 170. Mounted on the rear panel 154 below the elements 166–170 are a 37-pin connector 172, which connects to the other end of the cable 44 running from the terminal means 48, and a 20-pin connector 174, which connects to one end of the cable 58 running to the computer unit 56.

The wiring of the elements 157–174, mounted at the rear of the housing 116, to the visual displays 122–128, the switches 130–134 and the potentiometers 136–140, mounted on the front of the housing 116, and to the three valve driver cards 142, 144, 146, mounted within the housing 116, is shown in FIG. 8. This wiring diagram is believed to be self-explanatory but will be briefly described.

Each of the valve driver cards 142, 144, 146 is connected by a respective group of four wires to the connector 172 having terminals as identified in FIG. 8B. One group of these is identified in FIG. 8B by the reference numeral 176. Each group of four wires connects through the connector 172 to a respective group of four wires in the cable 44, which cable wires in turn are connected at their ends connected to the terminal unit 48 to the four wires coming from the respective connector to which the respective LVDT is connected. For example, the group of wires 176 is connected through the cable 44 and the terminal strip 110 to the four wires of the cable 104, routed through the connector 86, to which the LVDT 27c is connected.

Each of the valve driver cards also has two wires connected between it and the connector 172 for transmitting its respective control signals through the cable 44 to the respective one of the electrohydraulic valves 26. In FIG. 8B one group of these two wires is identified by the reference numeral 178, which two wires are connected through the cable 44 to the two wires of the cable 98 fed through the connector 80 and connected to the terminal strip 110 (FIG. 4), to which two wires the valve 26c is connected.

Each of the valve driver cards also has in input terminal wired to receive a valve drive means control signal. In FIGS. 8A and 8B, the valve driver card 146 is shown connected to receive an input only from the potentiometer 140; however, each of the other two valve driver cards 142, 144 is connected to a respective one of the switches 130, 132 so that either a manual control signal from the respective potentiometer 136, 138 or an automatic control signal from the computer unit 56 can be connected to the respective valve driver card.

Each of the switches 130, 132, 134 is also connected to a respective display 122, 124, 126. These displays are connected to respective terminals of the connector 172 for receiving the rotational speed signals transmitted through the cable 44 from the match meter 50. These rotational speed signals cause the displays 122, 124, 126 to display the rotational speed of the respective screw conveyor element. These rotational speed signals are also transferred through the respective switches to the computer unit 56 when the switches are in their automatic position. The general functional nature of each of the switches 130–134 is apparent from the schematic illustration of the switch 34 in FIG. 1. The switches 130–134 are also connected to the connector 174, as are the displays 122–126.

The flow rate signals received over the cable 44 from the flow meters 24a, 24b connected to the terminal unit 48 are connected from the connector 172 to the connector 174 by the group of wires identified by the reference numeral 180 in FIGS. 8A and 8B.

The display 128 is connected to the connector 174 as shown in FIG. 8A. The display 128 is used to display the percent concentration set point which is being maintained by the control system 2.

Each of the potentiometers 136, 138, 140 defines a respective means for providing, to an operator located at the vehicle 60, manual control of the generation of the valve control signals output from the valve driver cards 142, 144, 146. Such control is by providing an analog signal in response to rotation of a knob connected to the potentiometer, which knob is the visible component of the potentiometer identified in FIGS. 5 and 6. The analog outputs from the potentiometer can be selectably connected through the respective switches to the inputs of the respective valve driver cards. That is, each of the switches 130, 132, 134 has an output terminal, two input terminals and a switch element connected to the output terminal for selectable contact with one of the two input terminals. As shown in FIGS. 8A and 8B, the switch 134 is used only to switch the rotational speed signal to the connector 174 for transmission to the computer unit 56; however, the two switches 130, 132 are fully implemented. That is, each of these two switches 130, 132 has its output terminal connected to the input of a respective one of the valve driver cards, and each of these switches has one of its input terminals connected to a respective one of the potentiometers 130, 132 and its other input terminal connected to the connector 174 for receiving a control signal from the computer unit 56. A switch element of each of these two switches thus can be manually moved (by the toggle lever apparent in FIGS. 5 and 6) to selectably connect one of the two input terminals to the output terminal so that the respective screw conveyor is remotely controlled from the frac van 60 is a selectable one of an automatic mode, wherein the switch element connects the input terminal receiving the signal from the computer unit 56 to the output terminal, and a manual mode, wherein the switch element connects the input terminal connected to the potentiometer to the output terminal. Each switch also has a terminal through which a signal is sent to indicate to the computer unit 56 whether the respective switch is in the automatic or manual position.

The computer unit 56 corresponds to the computer 32 in FIG. 1, and it includes a housing 182 illustrated in FIGS. 12, 13 and 14. The housing 182 has an elongated body 184 to which a front piece 186, having a window 188 disposed therein, is attached by latches 190. The housing 182 has a rear covering 192 attached to the body 184 by latches 194. The body 184 has a handle 196 attached to its top.

The rear covering 192 has a connector 198, a connector 200, and a connector 202 attached thereto as shown in FIGS. 13 and 14. The connector 198 connects to an external printer, and the connector 200 connects to an external power source. The connector 202 connects, via the cable 58, to the connector 174 of the display unit 54. The contacts, pins or terminals of the connector 202, as well as those of the connectors 198, 200, are wired within the housing 182 to connector terminals of a computer means illustrated in FIGS. 9-11. These wiring interconnections are more particularly shown in FIG. 15 wherein the connector terminals of the computer means include terminal blocks 204, 206, 208, 210, 212, and power terminals 241. The letter designations shown in FIG. 15 identify the contacts of the connector 202, which contacts are connected by the cable 58 to the correspondingly lettered contacts of the connector 174 identified in FIG. 8A.

The computer means, identified in FIGS. 9-11 by the reference numeral 216, is a suitable type known to the art and commercially available. In the preferred embodiment this is a Fischer & Porter Chameleon II model microcomputer and proportional integral and derivative (PID) controller. When the computer means 216 is mounted in the housing 182, the resulting computer unit 56 is adapted to be mounted in the frac van 60 with the display unit 54. This computer unit is used for providing automatic control of the generation of the valve control signals output from the valve driver cards 142, 144, 146 of the display unit 54. That is, the computer means 216 of the computer unit 56 automatically provides valve drive means control signals which are transferred through the connector 202, the cable 58, the connector 174, and the respective automatic/manual selector switches of the display unit 54 to the respective valve driver cards when the respective selector switches are in the automatic position. These automatic valve drive means control signals are generated in response to concentration set points entered through a keypad 218 of the computer means 216, which keypad 218 corresponds to the input device 38 illustrated in FIG. 1. Entry of these can be monitored through a display 219 corresponding to the display 41 in FIG. 1. These valve drive means control signals are also generated both in response to the flow rate indicating signals received from the flow meters 24a, 24b and in response to the rotational speed indicating signals received from the match meter 50. The ultimate control signal provided at the output of one of the valve driver cards is responsive to these valve drive means control signals and also the LVDT signals. Therefore, the computer unit, when suitably programmed as more particularly described hereinbelow, includes entry means (including the microcomputer and the keypad 218) for entering into the computer a plurality of set points defining respective concentrations of the solid particulate additive for respective resultant mixtures obtainable from the mixing tank 8 of the blending system with which the present invention is illustrated in FIG. 1. The computer unit also includes selector means (including the microcomputer and one or more of the keys of the keypad 218) for selecting one of the pluarlity of set points (such as by an operator depressing a key to cause the microcomputer to increment to the next or the selected set point). The computer unit also includes means (in the preferred embodiment, the programmed microcomputer and the PID controller), connected to the entry means and the selector means, for providing a valve drive means control signal in response to the flow rate indicating signal and the rotational speed indicating signal, and further in response to the selected one of the plurality of set points, so that the valve drive means control signal causes the valve drive means (in the preferred embodiment, one or more of the valve driver cards) to operate the screw conveyor at a speed which adds the appropriate quantity of the solid particulate additive to the pregelled liquid in the mixing tank to provide the resultant mixture with a constant concentration of the solid particulate additive for the selected one of the plurality of set points.

As previously mentioned, the terminal unit 48 and the display unit 54 are connected by the multi-conductor cable 44. Thus, the cable 44 provides conductor means for connecting terminals of the connector mount 106 of the terminal unit 48 to terminals of the connector mount 172 of the display unit 54 so that the flow rate indicating signals and the rotational speed indicating signals generated by the components on the blender trailer 52 are communicated through such conductor means to the display unit 54 and so that the valve control signals generated on the valve driver cards 142, 144, 146 are communicated through such conductor means to the terminal unit 48. The cable 44 can be of any suitable length and construction for the particular application or environment in which it is intended to be used. In general, it is selected to provide flexiblity as to where the display unit 44 can be located relative to the blender trailer 52. It is contemplated that the cable 44 can be equivalently implemented by any other suitable transmission means such as a radio link or other technique by which the signals can be transferred between relative remote locations.

The multi-conductor cable 58, by which the display unit 54 and the computer unit 56 are interconnected, defines another conductor means, this one for connecting terminals of the connector mount 174 to terminals of the connector mount 202 so that the flow indicating signals and the rotational speed indicating signals transferred from the terminal unit 48 to the display unit 54 can be further transferred through the display unit 54 to the computer unit 56 and so that the valve drive means control signals provided for automatically controlling the screw conveyors on the blender trailer can be communicated to the display unit 54.

In operation, the control system 2 can be used to control either manually or automatically the amount of the additive moved into the mixing tank 8 by any one of the three screw conveyors of the particular environment described with reference to FIG. 2 (for the implementation of the switches 130, 132, 134 in FIG. 8A, only two of the screw conveyors would be switchable into automatic operation; however, the principle of the present invention is readily carried into any suitable number of conveyors depending upon the computing capability available—to this end the following description will be given as if all three are fully implemented). Manual control of such screw conveyors is accomplished by an operator located at the frac van 6 manually manipulating whichever ones of the potentiometers 136, 138, 140 is connected through its respective switch to the respective valve driver card. This control is similar to previous types of manual control except that this manual control is being achieved remotely from the blender trailer 52 rather than from the control stand and the match meter 50 mounted on the trailer 52.

To control automatically the amount of the additive moved into the mixing tank 8, and thus to control automatically the concentration of the additive in, and the density of, the resultant fracturing slurry, the respective switches 130, 132, 134 are moved to the automatic position for those screw conveyors which are to be controlled automatically. With a switch in the automatic position, the respective rotational speed signal obtained from the match meter 50 is communicated over the cable 58 to the computer 216 for use along with the primary or base fluid flow rate signal provided from the flow meters 24a, 24b as connected to the computer 216 through the connector 174 and the crossover connnections made by the wires 180. This automatic control is also obtained by the signals provided from the switches 130, 132, 134 indicating whether they are in the manual position or the automatic position, which function of these switches is best illustrated in FIG. 1.

In addition to being responsive to these signals which are provided through the cable connections described hereinabove, the valve drive means control signals provided from the computer means 216 are also generated in response to metering factors, constants and additive concentration set points entered into the microcomputer through the keypad 218. The use of these, and the previously mentioned, inputs is indicated by the labeling in FIG. 16A, which depicts one portion of the flow chart of the program for controlling the computer means 216 to control automatically the screw conveyors illustrated with reference to the blender trailer 52 shown in FIG. 2. With respect to the entered data, FIG. 16 specifically calls for one or more sand concentration correction factors, sand concentration setpoints, and clean flow meter correction factors. These are parameters known to the art for particular types of equipment or are ascertainable in conjunction with a specifically designed program and actual implementation as would be known to the art. In the present embodiment, this information is manually entered by an operator; once entered, the computer can use it automatically in a ramped change or in response to a manually initiated instruction or control. It is contemplated, however, that these data could be automatically developed and used by means of suitable programming and hardware (i.e., processor and memory capability).

With reference particularly to the sand concentration correction factor, if the density measuring device 30 is used with the control system 2, the computer means 216 monitors the measured proppant concentration in the resultant slurry. The computer means 216 compares the measured value of the density with the set point and calculates a density, or proppant (sand in the FIG. 16 illustration) concentration, correction factor. If this option is not selected, the program sets the density/sand concentration correction factor equal to unity.

Figure 16A:
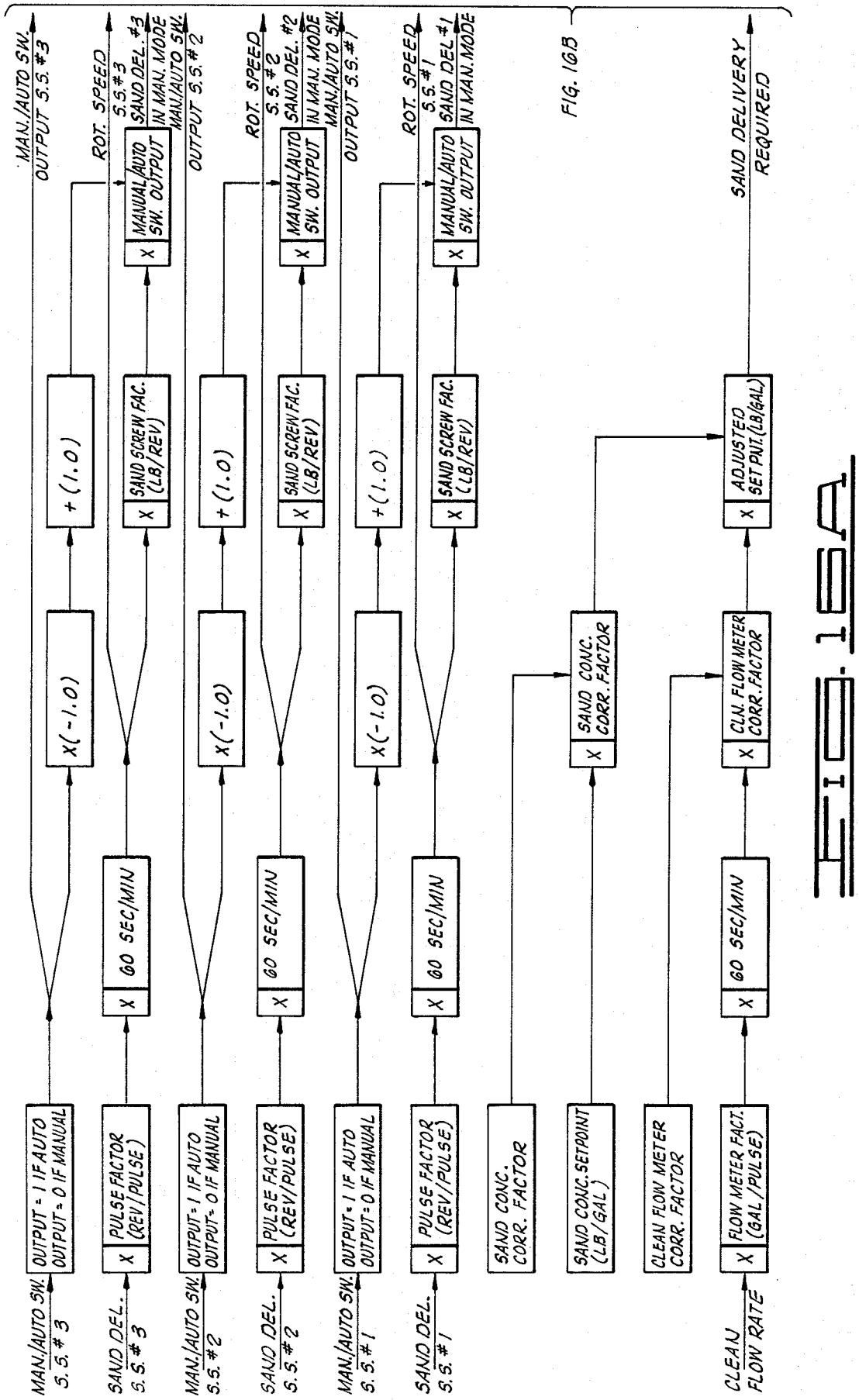

As indicated in FIG. 16A, the entered and selected concentration set point is multiplied by the correction factor to obtain an adjusted set point. The correction factor can be entered by the operator manually or it can be entered automatically, such as if the control system is used with the slurry density measuring device 30 as just described.

The microcomputer of the computer means 216 monitors the base fluid flow rate and calculates, using the adjusted set point, the required proppant delivery rate as depicted along the bottom of FIG. 16A. The total amount of fluid pumped is also totalized at this point in the program.

The microcomputer calculates (in a manner subsequently described) a required rotational speed at which each of the screw conveyors needs to be driven to obtain the required proppant delivery rate. Each such speed set point is sent to a respective PID controller of the computer means 216 as indicated in FIG. 16C. The microcomputer also sends to each PID controller the actual rotational speed of the respective screw conveyor. The total amount of proppant metered is also totalized at this point in the program.

With these respective two inputs of required rotational speed and actual rotational speed, the PID controller sends a valve drive means control signal from the computer unit 56 to the cable 58 and into the display unit 54 for application to the respective valve driver card. The respective valve driver card uses this signal along with the information obtained from the LVDT readings connected to the valve driver card through the connector 172, to generate the valve control signal transmitted through the cable 44 to the respective electrohydraulic valve of the respective screw conveyor. A PID controller outputs a signal to its valve driver card only if the respective selector switch on the front of the display unit 54 is placed in the automatic position. If the selector switch is in the manual position, the output from the PID controller is disconnected and the respective potentiometer connected in its place.

In the exemplary embodiment wherein three screw conveyors are used, once the microcomputer has determined the required total proppant quantity delivery rate, the microcomputer subtracts from this desired total delivery rate the actual quantity delivery rate for each of the screw conveyors which is being operated in the manual mode, thereby defining a difference which must be made up by the additive to be moved by any one or more remaining screw conveyors operating in the automatic mode. In the preferred embodiment, this difference is divided by the total number of screw conveyors indicated by their respective selector switches on the display unit 54 to be operating in the automatic mode. This division defines a quotient which is provided for each screw conveyor operating under automatic control. The quotient for each such automatically controlled conveyor is divided by the respective conveyor factor to obtain the aforementioned required rotational speed for that conveyor. Thus, when two or more of the screw conveyors are operating in the automatic mode, each screw conveyor's load is, in the preferred embodiment, made equal to each of the other screw conveyors being operated in the automatic mode. This methodology of the described embodiment is depicted in FIGS. 16A–16C.

In summary of at least some of the contemplated capabilities of the present invention, the control system 2 will maintain a constant proppant concentration in a fracturing slurry regardless of the fluctuations in the downhole pumping rate or the base fluid flow rate. If the control system 2 is used with the slurry density measuring device, the system can be used to maintain the proppant concentration set point regardless of changes in the accuracy of the base fluid and proppant delivery rate measurements. The system's computer can be programmed to change the proppant concentration set point to another value without operator assistance after receiving a set point change flag if a more fully automatic embodiment were developed. The operator can input the job's proppant concentration set points into a file of flags which will be read sequentially during the job to provide automatic entry of the correct proppant concentration set point throughout the fracturing operation. A master program can be included in the control system which will automatically calculate and input set point change flags during a fracturing operation. A master program of this type can control the proppant delivery system to provide a curvilinear proppant concentration schedule during a fracturing operation. The control system is intended to be operated at a remote location. Multiple proppant delivery devices can be controlled by a single control system to deliver the proppant required from each necessary to maintain a selected proppant concentration in the fracturing slurry. The control system 2 has been designed in its preferred embodiment so that it can be inexpensively retrofitted to existing fracturing blenders.

By using a screw conveyor and monitoring the inlet flow rate of the base fluid (as opposed to the outlet slurry flow rate or density), changes in the sand delivery rate can be made substantially instantaneously to facilitate ramp and curvilinear concentration changes.

When the slurry density measuring device is used, it is used only to fine-tune the measured proppant concentration in the fracturing slurry closer to the desired proppant concentration. The control system 2 does not use the density measuring device as the primary feedback for the control system; rather, the aforementioned inlet flow rate of the base fluid is used to facilitate relatively instantaneous concentration changes. When used, the density measuring device provides a signal of the actual concentration which can be compared against what should be provided given the computed rotational speed at which the control system 2 is to be driving the one or more screw conveyor elements. Any offset between these two values can be used to adjust the rotational rate at which the screw conveyor element is later driven to fine-tune the resultant concentration. Thus, the density measuring device can be used to correct for accuracy fluctuations occurring over time, such as occur as the screw conveyor element wears and thus delivers different quantities at the same rotational speed for different conditions of wear.

Thus, the present invention is well adapted to carry out the objects and attain the ends and advantages mentioned above as well as those inherent therein. While a preferred embodiment of the invention has been described for the purpose of this disclosure, changes in the construction and arrangement of parts can be made by those skilled in the art, which changes are encompassed within the spirit of this invention as defined by the appended claims.

What is claimed is:

1. Retrofit apparatus for controlling the blending of a solid substance with a liquid substance, said apparatus comprising:
   a multiple-conductor electrical cable;
   local terminal means, mountable on a conventional blender previously manufactured for use at a well site, for connecting respective ones of the conductors at one end of said cable to respective components mounted on said blender; and
   control means, mountable at a location within the vicinity of the well site but spaced from said blender and connectable to said respective ones of the conductors at the other end of said cable, for providing one of manual control signals and automatically calculated control signals through conductors of said cable in response to signals received by said control means through other conductors of said cable from said components of said blender connected by said terminal means to said cable, said control signals controlling the amount of the solid substance added to the liquid substance.

2. Apparatus as defined in claim 1, wherein:
   said components of said blender include:
      a mixing container wherein the solid substance and the liquid substance are mixed;
      screw conveyor means for conveying the solid substance into said mixing container, said screw conveyor means having a screw element;
      hydraulic means for rotating said screw element, said hydraulic means including an electrohydraulic valve controlling the flow of a driving fluid used to rotate said screw element, said valve having first transducer means connected thereto for providing an electrical signal representative of the state of operation of said valve;
      second transducer means for providing an electrical signal representative of the rotational speed of said screw element; and
      flow meter means for providing an electrical signal representative of the flow rate of the liquid substance flowing into said mixing container; and
   said local terminal means includes:
      a housing;
      a first connector attached to said housing and adapted to connect to said first transducer means so that the electrical signal of said first transducer means is provided to said terminal means;

a second connector attached to said housing and adapted to connect to said second transducer so that the electrical signal of said second transducer means is provided to said terminal means;

a third connector attached to said housing and adapted to connect to said flow meter means so that the electrical signal of said flow meter means is provided to said terminal means;

a fourth connector attached to said housing and adapted to connect to said valve;

a fifth connector attached to said housing and adapted to connect to said one end of said cable; and interconnect means, attached to said housing, for communicating the electrical signals of said first transducer means, said second transducer means, and said flow meter means received through said first, second and third connectors to respective conductors of said fifth connector and for communicating said control signals from said control means, received over said cable, to said valve connected to said fourth connector.

3. Apparatus as defined in claim 2, wherein said control means includes:

display means, adapted to mount on a vehicle and having a sixth connector adapted to connect to said other end of said cable, for visually displaying the rotational speed of said screw element in response to the electrical signal of said second transducer means, said display means further having a seventh connector connected to said sixth connector; and electronic microcomputer means, adapted to mount in said vehicle with said display means and having an eighth connector adapted to connect to said seventh connector, for providing automatic control of the generation of said control signals.

4. Apparatus as defined in claim 3, wherein said display means includes:

manual means for providing, to an operator located at said vehicle, manual control of the generation of said control signals; and switch means for manually selecting which one of said microcomputer means and said manual means controls the generation of said control signals at any one time.

5. Apparatus as defined in claim 4, wherein:

said display means further includes valve drive means for outputting said control signals, said valve drive means having an output connected to said sixth connector, and said valve drive means having an input; and said switch means includes:

an output terminal connected to said input of said valve drive means;

a first input terminal connected to said seventh connector for connecting therethrough to said computer means;

a second input terminal connected to said manual means; and a switch element connected to said output terminal for selectable contact with one of said first and second input terminals.

6. Apparatus for remotely manually or automatically controlling, from a frac van, the delivery, via a screw conveyor, of a solid particulate additive into a mixing tank into which a pregelled liquid is concurrently flowed so that a fracturing slurry having a desired density is provided at the output of the mixing tank, which screw conveyor and mixing tank are parts of a blender trailer also having: a flow meter for detecting the flow rate of the pregelled liquid flowing into the mixing tank, and a transducer for detecting the rotational speed of the screw conveyor, said apparatus comprising:

a control valve, mounted on the blender trailer, for controlling the rotational speed of the screw conveyor;

connector terminal means, mounted on the blender trailer and having a first connector mount, for communicating each of a flow rate indicating signal derived from the flow meter and a rotational speed indicating signal derived from the transducer to respective terminals of said first connector mount and for communicating a valve control signal from a terminal of said first connector mount to said control valve;

a display unit mounted in the frac van, said display unit including:

a first housing disposed in the frac van;

a second connector mount having respective terminals, said second connector mount attached to said first housing;

valve drive means, retained in said first housing, for providing said valve control signal to a terminal of said second connector mount;

visual display means, mounted on said first housing, for indicating the rotational speed of the screw conveyor, said visual display means connected to a terminal of said second connector mount; and a third connector mount, attached to said first housing, said third connector mount having a plurality of terminals connected to said valve drive means, said visual display means and said second connector mount;

a computer unit mounted in the frac van, said computer unit including:

a second housing disposed in the frac van;

a fourth connector mount having a plurality of terminals, said fourth connector mount attached to said second housing; and computer means, disposed in said second housing and connected to terminals of said fourth connector mount, for providing a valve drive means control signal to a terminal of said fourth connector mount in response to the flow rate indicating signal and the rotational speed indicating signal;

first conductor means, adapted for connection to said first connector mount and said second connector mount, for connecting terminals of said first connector mount to terminals of said second connector mount so that the flow rate indicating signal and the rotational speed indicating signal are communicated through said first conductor means to said display unit and so that the valve control signal is communicated through said first conductor means to said connector terminal means; and second conductor means, adapted for connection to said third connector mount and said fourth connector mount, for connecting terminals of said third connector mount to terminals of said fourth connector mount so that the flow rate indicating signal and the rotational speed indicating signal transferred from said second connector mount to said third connector mount through said display unit are communicated through said second conductor means to said computer unit and so that the valve drive means control signal is communicated through said second conductor means to said display unit.

7. Apparatus as defined in claim 6, wherein said display unit further includes:
   analog means, attached to said first housing, for manually defining another valve drive means control signal; and
   switch means, attached to said first housing, for connecting a selectable one of the valve drive means control signal from said computer means and the valve drive means control signal from said analog means to said valve drive means.

8. Apparatus as defined in claim 7, wherein said analog means includes a potentiometer.

9. Apparatus as defined in claim 6, wherein said display unit further includes a fifth connector mount attached to said first housing and connected to said third connector mount for receiving a signal from a densimeter connected into an outlet flow from the mixing tank so that the densimeter signal can be communicated therethrough to said computer means through said second conductor means.

10. Apparatus as defined in claim 6, wherein said computer means includes:
    entry means for entering into said computer means a plurality of set points defining respective concentrations of the solid particulate additive for respective resultant mixtures obtainable from the mixing tank;
    selector means, connected to said entry means, for selecting one of said plurality of set points; and
    means, connected to said entry means and said selector means, for providing said valve drive means control signal in response to the flow rate indicating signal and the rotational speed indicating signal, and further in response to the selected one of said plurality of set points, so that said valve drive means control signal causes said valve drive means to operate the screw conveyor at a speed which adds the appropriate quantity of the solid particulate additive to the pregelled liquid in the mixing tank to provide the resultant mixture with a constant concentration of the solid particulate additive for the selected one of said plurality of set points.

11. Apparatus as defined in claim 6, wherein:
    said control valve for controlling the rotational speed of the screw conveyor has associated therewith a linear variable differential transformer for providing a valve status signal in response to the state of operation of said valve, said transformer connected to said connector terminal means for communicating said valve status signal through said first conductor means; and
    said valve drive means includes:
      first input means, connected to said second connector mount, for receiving said valve status signal so that said valve drive means is responsive to said valve status signal in providing said valve control signal; and
      output means, connected to said second connector mount, for communicating said valve control signal from said valve drive means to a terminal of said second connector mount.

12. Apparatus as defined in claim 11, wherein:
    said valve drive means further includes a second input; and
    said display means further includes:
      a potentiometer attached to said first housing; and
      a switch attached to said first housing, including:
        an output terminal connected to said second input of said valve drive means;
        a first input terminal connected to said third connector mount for receiving said valve drive means control signal therethrough;
        a second input terminal connected to said potentiometer; and
        switch element means for selectably connecting one of said first and second input terminals to said output terminal so that the screw conveyor is remotely controlled from the frac van in a selectable one of an automatic mode, wherein said switch element means connects said first input terminal to said output terminal, and a manual mode, wherein said switch element means connects said second input terminal to said output terminal.

13. Method of remotely controlling the quantity of a solid substance added to a liquid substance by each of two screw conveyors, which control occurs at a remote control station having computer means for automatically operating the screw conveyors, and having first potentiometer means for manually operating one of the screw conveyors, and having second potentiometer means for manually operating the other of the screw conveyors, and having first switch means for connecting either the computer means or the first potentiometer means to control the one screw conveyor, and having second switch means for connecting either the computer means or the second potentiometer means to control the other screw conveyor, said method comprising:
    selecting whether the one screw conveyor is to be operated automatically or manually and setting the first switch means in an automatic position or a manual position accordingly;
    selecting whether the other screw conveyor is to be operated automatically or manually and setting the second switch means in an automatic position or a manual position accordingly;
    transmitting to the computer means a signal indicating whether the first switch means is in the automatic position or the manual position;
    transmitting to the computer means a signal indicating whether the second switch means is in the automatic position or the manual position;
    determining in the computer means the actual rotational speed of the one screw conveyor;
    computing in the computer means, in response to the actual rotational speed of the one screw conveyor, the actual quantity delivery rate of the solid substance by the one screw conveyor;
    determining in the computer means the actual rotational speed of the other screw conveyor;
    computing in the computer means, in response to the actual rotational speed of the other screw conveyor, the actual quantity delivery rate of the solid substance by the other screw conveyor;
    determining in the computer means the desired total quantity delivery rate of the solid substance needed to be delivered by both of the screw conveyors;
    subtracting, in the computer means, from the desired total quantity delivery rate the actual quantity deliver rate of the one screw conveyor if the first switch means is in the manual position and the actual quantity delivery rate of the other screw conveyor if the second switch means is in the manual position, thereby defining a difference;

dividing, in the computer means, the difference by the total number of the first and second switch means in the automatic position, thereby defining a quotient;

providing from the computer means, in response to the actual rotational speed of the one screw conveyor and the quotient, a control signal for automatically controlling the one screw conveyor when the first switch means is in the automatic position;

providing from the computer means, in response to the actual rotational speed of the other screw conveyor and the quotient, a control signal for automatically controlling the other screw conveyor when the second switch means is in the automatic position;

providing from the first potentiometer means a control signal for manually controlling the one screw conveyor when the first switch means is in the manual position; and providing from the second potentiometer means a control signal for manually controlling the other screw conveyor when the second switch means is in the manual position.

14. Retrofit apparatus for controlling the blending of a solid substance with a liquid substance, said apparatus comprising:

a multiple-conductor electrical cable;

local terminal means, mountable on a conventional blender previously manufactured for use at a well site, for connecting respective ones of the conductors at one end of said cable to respective components mounted on said blender; and control means, mountable at a location within the vicinity of the well site but spaced from said blender and connectable to said respective ones of the conductors at the othe end of said cable, for providing control signals through conductors of said cable in response to signals received by said control means through other conductors for said cable from said components of said blender connected by said terminal means to said cable, said control signals controlling the amount of the solid substance added to the liquid substance, wherein said components of said blender include:

a mixing container wherein the solid substance and the liquid substance are mixed;

screw conveyor means for conveying the solid substance into said mixing container, said screw conveyor means having a screw element;

hydraulic means for rotating said screw element, said hydraulic means including an electrohydraulic valve controlling the flow of a driving fluid used to rotate said screw element, said valve having first transducer means connected thereto for providing an electrical signal representative of the state of opeation of said valve;

second transducer means for providing an electrical signal representative of the rotational speed of said screw element; and flow meter means for providing an electrical signal representative of the flow rate of the liquid substance flowing into said mixing container; and said local terminal means includes:

a housing;

a first connector attached to said housing and adapted to connect to said first transducer means so that the electrical signal of said first transducer means is provided to said terminal means;

a second connector attached to said housing and adapted to connect to said second transducer so that the electrical signal of said second transducer means is provided to said terminal means;

a third connector attached to said housing and adapted to connect to said flow meter means so that the electrical signal of said flow meter means is provided to said terminal means;

a fourth connector attached to said housing and adapted to connect to said valve;

a fifth connector attached to said housing and adapted to connect to said one end of said cable; and interconnect means, attached to said housing, for communicating the electrical signals of said first transducer means, said second transducer means, and said flow meter means received through said first, second and third connectors to respective conductors of said fifth connector and for communicating said control signals from said control means, received over said cable, to said valve connected to said fourth connector.

15. Apparatus as defined in claim 14, wherein said control means includes:

display means, adapted to mount on a vehicle and having a sixth connector adapted to connect to said other end of said cable, for visually displaying the rotational speed of said screw element in response to the electrical signal of said second transducer means, said display means further having a seventh connector connected to said sixth connector; and electronic microcomputer means, adapted to mount in said vehicle with said display means and having an eighth connector adapted to connect to said seventh connector, for providing automatic control of the generation of said control signals.

16. Apparatus as defined in claim 15, wherein said display means includes:

manual means for providing, to an operator located at said vehicle, manual control of the generation of said control signals; and switch means for manually selecting which one of said microcomputer means and said manual means controls the generation of said control signals at any one time.

17. Apparatus as defined in claim 16, wherein:

said display means further includes valve drive means for outputting said control signals, said valve drive means having an output connected to said sixth connector, and said valve drive means having an input; and said switch means includes:

an output terminal connected to said input of said valve drive means;

a first input terminal connected to said seventh connector for connecting therethrough to said computer means;

a second input terminal connected to said manual means; and a switch element connected to said output terminal for selectable contact with one of said first and second input terminals.

* * * * *